(12) United States Patent
Richert et al.

(10) Patent No.: US 11,302,065 B2
(45) Date of Patent: Apr. 12, 2022

(54) SYSTEMS AND METHODS FOR FILTERING SENSOR DATA TO REMOVE DATA POINTS ASSOCIATED WITH EPHEMERAL OBJECTS

(71) Applicant: Woven Planet North America, Inc., Los Altos, CA (US)

(72) Inventors: Wilhelm Richert, Feldkirchen (DE); Darko Zikic, Munich (DE); Clemens Marschner, Munich (DE)

(73) Assignee: Woven Planet North America, Inc., Los Altos, CA (US)

( * ) Notice: Subject to any disclaimer, the term of this patent is extended or adjusted under 35 U.S.C. 154(b) by 62 days.

(21) Appl. No.: 16/718,024

(22) Filed: Dec. 17, 2019

(65) Prior Publication Data

US 2021/0183139 A1 Jun. 17, 2021

(51) Int. Cl.
*G06T 15/30* (2011.01)
(52) U.S. Cl.
CPC .......... *G06T 15/30* (2013.01); *G06T 2210/22* (2013.01)
(58) Field of Classification Search
CPC ..... G06T 15/30; G06T 2210/22; G06T 19/20; G06T 11/60
See application file for complete search history.

(56) References Cited

U.S. PATENT DOCUMENTS

| | | | | |
|---|---|---|---|---|
| 7,598,958 B1 * | 10/2009 | Kelleher | ............... | G06F 9/3877 345/502 |
| 8,436,851 B2 * | 5/2013 | Hoffman | ............... | G06T 15/005 345/419 |
| 9,704,270 B1 * | 7/2017 | Main | .......................... | G06T 9/00 |
| 2003/0164834 A1 * | 9/2003 | Lefebvre | .................... | G06T 1/20 345/506 |
| 2010/0085358 A1 * | 4/2010 | Wegbreit | ................ | G06T 19/20 345/420 |
| 2015/0356357 A1 * | 12/2015 | McManus | ............... | G06T 7/254 382/104 |

(Continued)

FOREIGN PATENT DOCUMENTS

KR 1020190043035 A 4/2019

OTHER PUBLICATIONS

International Searching Authority, International Search Report and Written Opinion, PCT/US2020/065421, dated Apr. 8, 2021, 9 pages.

*Primary Examiner* — Said Broome
(74) *Attorney, Agent, or Firm* — Christopher G. Darrow; Darrow Mustafa PC

(57) ABSTRACT

Examples disclosed herein may involve (i) obtaining 2D image data and 3D sensor data that is representative of an area, (ii) identifying a first set of pixels associated with ephemeral objects detected in the area and a second set of pixels associated with non-ephemeral objects detected in the area, (iii) identifying a first set of ephemeral 3D data points associated with the detected ephemeral objects and a second set of non-ephemeral 3D data points associated with the detected non-ephemeral objects, (iv) mapping the first and second sets of 3D data points to a grid of voxels associated with the area, (v) making a determination that one or more voxels in the grid each contain a threshold extent of ephemeral data points, and (vi) based at least in part on the determination, filtering the 3D sensor data to remove the 3D data points contained within the one or more voxels.

20 Claims, 12 Drawing Sheets

(56) References Cited

U.S. PATENT DOCUMENTS

2018/0340781 A1 11/2018 Doria et al.
2019/0050648 A1 2/2019 Stojanovic et al.
2019/0266779 A1 8/2019 Kulkarni et al.
2019/0371052 A1 12/2019 Kehl et al.

* cited by examiner

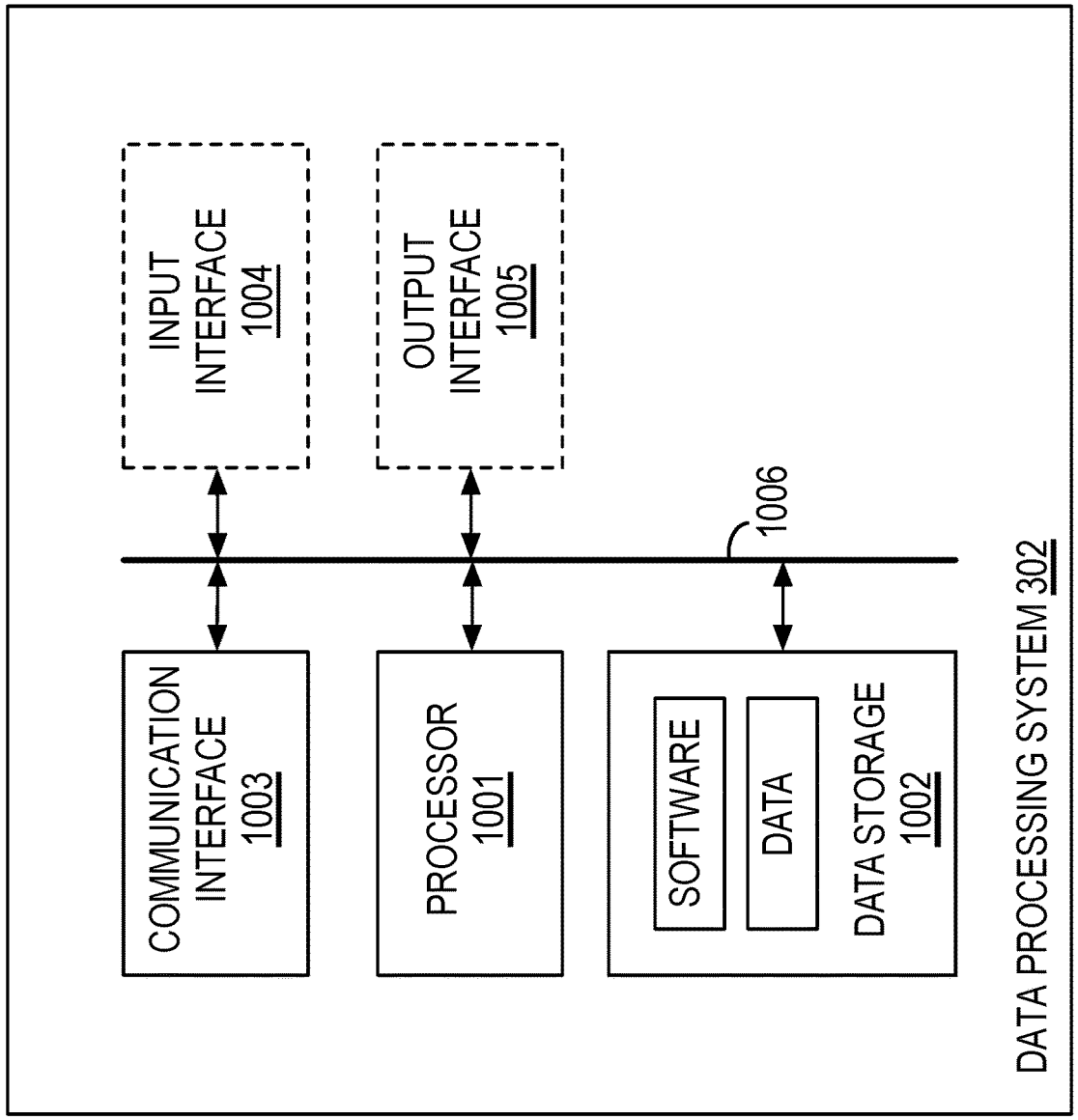

SYSTEMS AND METHODS FOR FILTERING SENSOR DATA TO REMOVE DATA POINTS ASSOCIATED WITH EPHEMERAL OBJECTS

BACKGROUND

Vehicles are increasingly being equipped with technology that allows them to monitor their surrounding environment and make informed decisions on how to react. These vehicles, whether autonomously driven, semi-autonomously driven, and/or manually driven, may be capable of sensing their environment and then safely navigating and driving with little or no human input, as appropriate. To help facilitate this functionality, such a vehicle may have an on-board computing system that is configured to perform functions such as localization, object detection, and navigation path planning using a variety of data, including but not limited to sensor data captured by the vehicle and map data related to the vehicle's surrounding environment.

SUMMARY

In one aspect, the disclosed technology may take the form of a method that involves (i) obtaining two-dimensional (2D) image data and three-dimensional (3D) sensor data that is representative of an area, (ii) identifying, within the 2D image data, a first set of pixels associated with ephemeral objects detected in the area and a second set of pixels associated with non-ephemeral objects detected in the area, (iii) based on the first and second sets of pixels, identifying, within the 3D sensor data, a first set of ephemeral 3D data points associated with the detected ephemeral objects and a second set of non-ephemeral 3D data points associated with the detected non-ephemeral objects, (iv) mapping the first and second sets of 3D data points to a grid of voxels associated with the area, (v) making a determination that one or more voxels in the grid each contain a threshold extent of ephemeral data points, and (vi) based at least in part on the determination, filtering the 3D sensor data to remove the 3D data points contained within the one or more voxels.

In example embodiments, the determination that the one or more voxels in the grid each contain the threshold extent of ephemeral data points may comprise a first determination, and the method may additionally involve making a second determination that the one or more voxels each have a threshold extent of surrounding voxels that contain the threshold extent of ephemeral data points, in which case the function of filtering may further be based on the second determination. In such embodiments, the method could also additionally involve making a third determination that the one or more voxels each contain a threshold number of total 3D data points, in which case the function of filtering may further be based on the third determination. Moreover, in such embodiments, the threshold extent of surrounding voxels that contain the threshold extent of ephemeral data points may also be required to contain the threshold number of total 3D data points.

Further, in example embodiments, the function of making the determination that the one or more voxels each contain the threshold extent of ephemeral data points may involve, for each of the one or more voxels: (i) determining a ratio between ephemeral data points and non-ephemeral data points contained within the voxel; and (ii) determining that the ratio between ephemeral data points and non-ephemeral data points contained within the voxel exceeds a threshold ratio.

Further yet, in example embodiments, the function of identifying the first set of pixels associated with the detected ephemeral objects and the second set of pixels associated with the detected non-ephemeral objects may involve (i) performing semantic segmentation on the 2D image data to classify pixels within the 2D image data as belonging to classes of ephemeral objects and non-ephemeral objects detected in the area, and (ii) based on the classification of the pixels within the 2D image data, identifying the first set of pixels associated with the detected ephemeral objects and the second set of pixels associated with the detected non-ephemeral objects.

Further still, in example embodiments, the method may additionally involve, before using the first set of pixels associated with the detected ephemeral objects as a basis for identifying the first set of 3D data points, expanding the first set of pixels to include additional pixels that were not identified as being associated with ephemeral objects detected in the area.

Even further, in example embodiments, the 2D image data and the 3D sensor data may have been captured by a vehicle that was operating in the area, and the captured 2D image data may have a temporal correlation with the captured 3D sensor data.

Additionally, in example embodiments, the 3D sensor data may comprise a point cloud of Light Detection and Ranging (LIDAR) data.

Additionally still, in example embodiments, the method may involve using the filtered 3D sensor data to provide a map of the area and/or using the filtered 3D sensor data to perform localization for the vehicle.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable by at least one processor to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 10 depicts a simplified block diagram of an example data processing system.

DETAILED DESCRIPTION

Certain vehicles may be equipped with sensors that enable such vehicles to capture sensor data that is representative of the vehicle's surrounding environment. This sensor data may be used for various purposes, including but not limited to (i) "on-board" tasks at the vehicle itself, such as localization, object detection, and/or path planning, and (ii) "offline" tasks that are performed by a computing system outside of the vehicle, such as offline versions of the aforementioned on-board tasks (e.g., offline localization) and/or the creation of maps that may subsequently be used by a vehicle to perform the aforementioned on-board tasks.

In practice, the sensor data captured by vehicles may include data points associated with both "ephemeral" objects and "non-ephemeral" objects that were within the vehicle's surrounding environment. "Ephemeral" objects (which may also be referred to as "dynamic" or "non-permanent" objects) are objects in an environment that are not considered to be permanent to the environment, such as other vehicles, pedestrians, bicyclists, animals, and/or traffic cones, among other examples. On the other hand, "non-ephemeral" objects (which may also be referred to as "static," "permanent," or "semi-permanent" objects) are objects in an environment that are considered to be permanent (or at least relatively permanent when compared to moving agents through a scene) to the environment, such as buildings, trees, signs, traffic lights, walls, and/or sidewalks, among other examples. In this respect, it should be understood that whether an object is considered to be an ephemeral or non-ephemeral to an environment may ultimately depend on the object's potential for movement within that environment, where objects that generally have a potential to move within an environment may be considered ephemeral objects and objects that generally do not have a potential to move or change location within an environment may be considered non-ephemeral objects.

Figure 1:
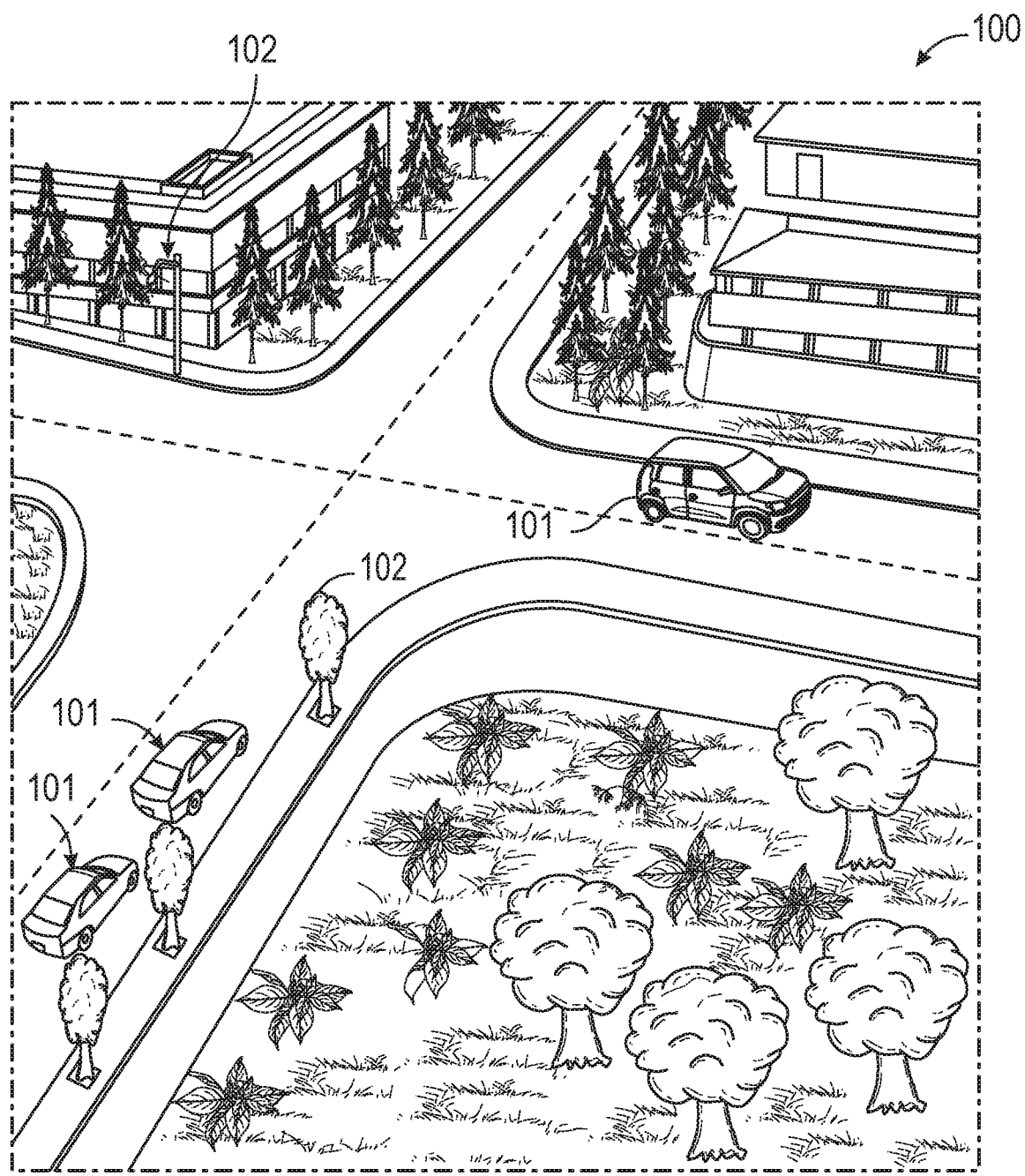
FIG. 1 depicts an example visualization of 3D sensor data that is representative of an environment in which ephemeral and non-ephemeral objects exist.

To illustrate with an example, FIG. 1 depicts a visualization 100 of 3D sensor data that is representative of an environment in which both ephemeral objects 101 and non-ephemeral objects 102 exist. For example, as shown in FIG. 1, ephemeral objects 101 include vehicles traveling on the road, while non-ephemeral objects 102 include buildings and trees. Many other examples of ephemeral objects 101 and non-ephemeral objects 102 are possible as well.

However, when sensor data captured by vehicles includes data points associated with ephemeral objects, it may be difficult or impossible to use such sensor data when performing some of the tasks discussed above.

For instance, one possible use of sensor data captured by a vehicle is the creation of maps of real-world environments, such as high-definition maps for use by autonomous or semi-autonomous vehicles. However, if the captured sensor data includes data points associated with ephemeral objects such as vehicles, pedestrians, animals, etc., it becomes more difficult to use such sensor data for map creation. Indeed, in most cases, the maps to be created should not include any ephemeral objects—particularly when the maps are being used for tasks such as localization, object detection, or path planning. As such, when sensor data captured by vehicles includes data points associated with ephemeral objects, this either renders such sensor data unusable for map creation or may require a human to engage in a manual process for removing the data points associated with ephemeral objects, which is time consuming, labor intensive, and prone to error.

Another possible use of sensor data captured by a vehicle is for purposes of performing a localization process for a vehicle, which may attempt to determine the vehicle's position by comparing sensor data captured by the vehicle to a set of reference data (e.g., data points associated with landmarks in the vehicle's surrounding area). However, when sensor data captured by a vehicle includes data points associated with ephemeral objects such as vehicles, pedestrians, animals, etc., these data points may degrade the accuracy of the localization process and potentially even cause the localization process to fail.

Sensor data that includes data points associated with ephemeral objects can give rise to other problems as well.

To help address these and other problems, disclosed herein are methods for filtering 3D sensor data to remove data points associated with ephemeral objects, which may improve the ability to use such sensor data for map creation and localization.

For instance, disclosed herein is a first method for filtering 3D sensor data to remove data points associated with ephemeral objects that involves (i) obtaining 2D image data and 3D sensor data that is representative of an area, (ii) identifying a set of pixels within the 2D image data that are associated with ephemeral objects (referred to herein as "ephemeral pixels") using a technique such as segmentation, (iii) expanding the identified set of ephemeral pixels using a technique such as dilation, (iv) identifying a set of 3D data points in the 3D sensor data that correspond to the expanded set of ephemeral pixels, and (v) filtering the 3D sensor data by removing the identified set of 3D data points.

Further, disclosed herein is a second method for filtering 3D sensor data to remove data points associated with ephemeral objects that involves (i) obtaining 2D image data and 3D sensor data that is representative of an area, (ii) identifying one set of pixels within the 2D image data that are associated with ephemeral objects (referred to herein as "ephemeral pixels") and another set of pixels within the 2D image data that are associated with non-ephemeral objects (referred to herein as "non-ephemeral pixels") using a technique such as segmentation, (iii) identifying one set of 3D data points in the 3D sensor data correspond to the set of ephemeral pixels (referred to herein as "ephemeral 3D data points") and another set of 3D data points in the 3D sensor data that correspond to the set of non-ephemeral pixels (referred to herein as "non-ephemeral 3D data points"), (iv) mapping the sets of ephemeral and non-ephemeral 3D data points to a grid of voxels, (v) determining voxel statistics for the grid of voxels that indicate an extent of ephemeral 3D data points contained within each voxels, (vi) based on the voxel statistics, identifying at least one voxel that meets a set of one or more conditions governing whether a voxel is classified as "ephemeral," and (v) filtering the 3D sensor data to remove the 3D data points contained within the identified at least one voxel.

In accordance with this second method, the set of one or more conditions governing whether a voxel is classified as an "ephemeral" voxel may take various forms, and in one embodiment, may comprise at least the following two conditions: (i) that the voxel contains a threshold extent of ephemeral 3D data points, and (ii) that the voxel has a threshold extent of adjacent voxels that each also contains a threshold extent of ephemeral 3D data points. However, as discussed in further detail below, the set of one or more conditions may take other forms as well.

Figure 2:
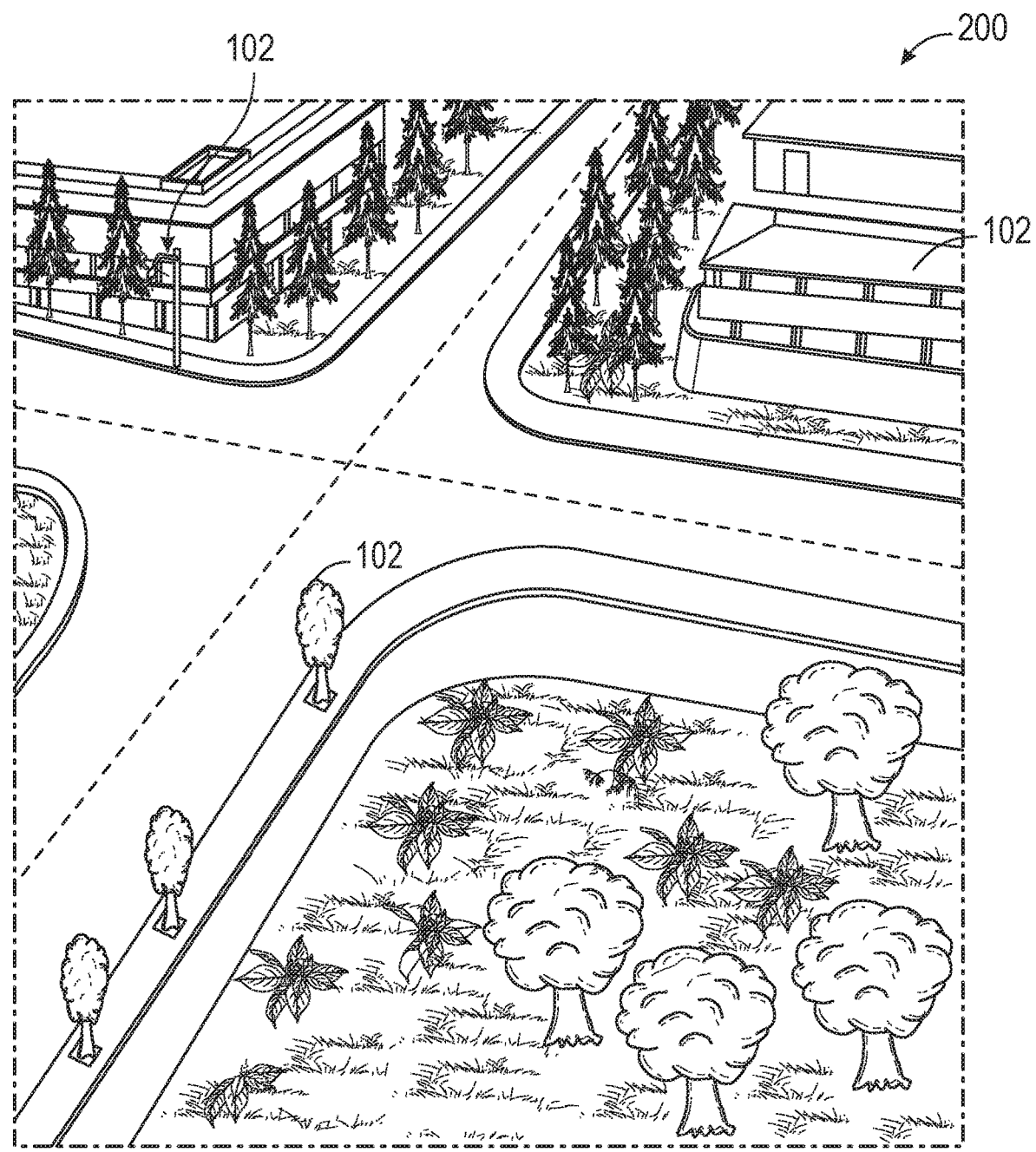
FIG. 2 depicts the example visualization of the 3D sensor data of FIG. 1 after 3D data points associated with ephemeral objects have been removed.

To illustrate these disclosed methods with an example, FIG. 2 depicts a later version of visualization 100 of FIG. 1 after the 3D sensor data has been filtered to remove the 3D data points associated with ephemeral objects 101 (while the 3D data points associated with non-ephemeral objects 102 remain). Beneficially, with the 3D data points associated ephemeral objects 101 removed, the 3D sensor data is now more suitable for use when carrying out tasks such as map creation and localization.

The disclosed techniques for filtering 3D sensor data to remove data points associated with ephemeral objects are described in more detail below.

Figure 3:
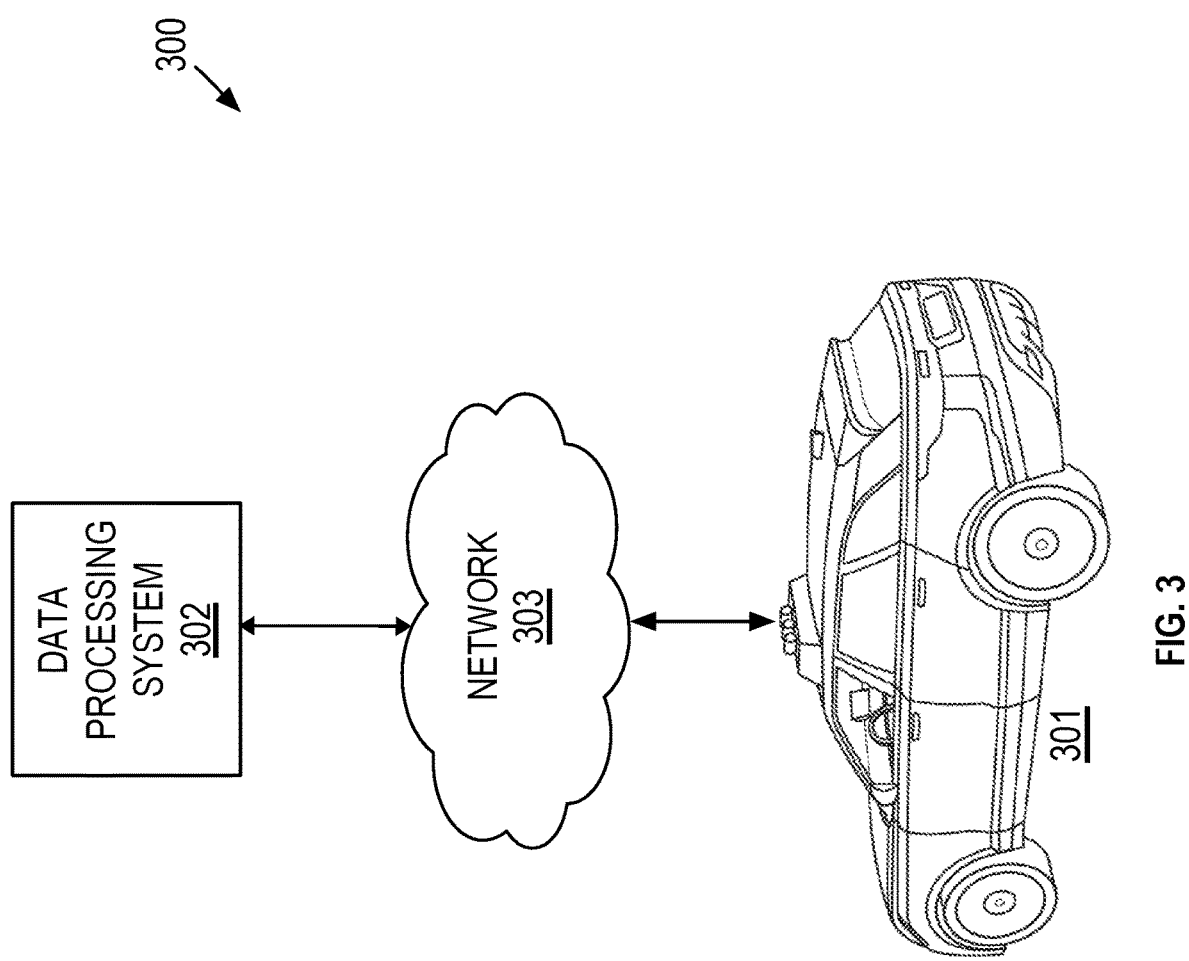
FIG. 3 depicts a simplified block diagram of an example system configuration.

Turning now to FIG. 3, a simplified diagram is provided of an example system configuration 300 in which aspects of the present disclosure may be implemented. As shown, system configuration 300 may include one or more collection vehicles 301 and a data processing system 302, which are communicatively coupled to one another via one or more communication networks 303 (e.g., one or more wired and/or wireless communication networks).

Collection vehicle 301 may take the form of an autonomous, a semi-autonomous vehicle, or a manually-driven vehicle. In any case, collection vehicle 301 is configured to perform missions during which collection vehicle 301 drives through real-world environments where collection vehicle 301 encounters a variety of objects, such as other vehicles, buildings, pedestrians, animals, streets, curbs, traffic signs and lights, trees and other plants, etc., and captures sensor data from which such real-world environments can be analyzed. This sensor data may take various forms.

As one possibility, collection vehicle 301 may be equipped to capture 2D sensor data, which may take the form of 2D data captured by a set of one or more 2D sensors (e.g., cameras) affixed to collection vehicle 301, among other possible forms of 2D sensor data.

As another possibility, collection vehicle 301 may be equipped to capture 3D sensor data, which may take the form of 3D data captured by one or more 3D sensors affixed to collection vehicle 301, such as LIDAR data captured by one or more LIDAR devices, RADAR data captured by one or more RADAR devices, and/or SONAR data captured by one or more SONAR devices, among other possible forms of 3D sensor data.

In operation, collection vehicle 301 is equipped to capture 2D and 3D sensor data that have a temporal and spatial relationship, which enables systems such as data processing system 302 to leverage both forms of data when processing and analyzing the captured sensor data. As to the temporal relationship, each given sensor data captured by collection vehicle 301 has at least one respective capture time associated with the given sensor data. For example, at a given capture time, collection vehicle 301 may capture a given frame of 2D sensor data (e.g., multiple images) that comprises a respective capture of 2D sensor data (e.g., a respective image) from each of the one or more 2D sensors of collection vehicle 301. Similarly, at a given capture time or over a given range of capture times, collection vehicle 301 may capture a given sweep of 3D sensor data (e.g., a 360° sweep of LIDAR data).

While collection vehicle 301 may capture multiple types of sensor data at any given point in time, in practice, different types of collection vehicle's sensors have different capture rates (e.g., each camera may capture 2D sensor data at a rate of 60 images per second while a LIDAR device may capture 3D sensor data at a rate of 10 360°-sweeps per second). In this regard, each capture of 2D sensor data may correspond to a respective capture time in accordance with a first capture rate (e.g., $t_0$, $t_0+1/60^{th}$ sec, $t_0+2/60^{th}$ sec, etc.), and each capture of 3D sensor data may correspond to a respective capture-time range (or singular capture time) in accordance with a second capture rate (e.g., $t_0$ to $t_0+1/10^{th}$ sec, to $+1/10^{th}$ sec to $t_0+2/10^{th}$ sec, etc.). Despite these different capture rates, there is temporal relationship between different forms of sensor data captured by collection device 301 that is defined by the respective capture times of the sensor data and the respective rates at which that data is captured (e.g., a given 360° sweep of LIDAR data corresponds to 6 images from a given camera).

In addition to the aforementioned temporal relationship, 2D and 3D sensor data captured by collection vehicle 301 may also have a spatial relationship. For instance, collection device 301 may be equipped with a set of 2D sensors (e.g., cameras) that are arranged in a manner that collectively provides a 360° view of the collection vehicle's surroundings, where each given 2D sensor captures sensor data from only a portion of that collective view (e.g., 2D images of a particular 60° view of the collection vehicle's surroundings). Collection device 301 may be further equipped with a LIDAR device that, for each given sweep, rotates and captures 3D sensor data along a 360° view of the collection vehicle's surroundings. Thus, a capture of 2D sensor data by a given 2D sensor may correspond to only a portion of a capture of 3D sensor data (e.g., an image may correspond to only 60° of a 360° LIDAR sweep). However, as a result of a calibration process for collection device 301, a spatial relationship can be established between captured 2D and 3D sensor data such that an object identified in the 2D space can be mapped into the 3D space and vice versa.

Additional details regarding collection vehicle 301 are described later with reference to FIG. 10.

Data processing system 302 may include one or more computing systems that have been configured to perform a variety of functions disclosed herein related to processing sensor data captured by collection vehicles 301 and filtering such sensor data to remove data associated with ephemeral objects. Additional functional details regarding data processing system 302 are described later with reference to FIGS. 4-9, and additional structural details regarding data processing system 302 are described later with reference to FIG. 10.

Example functions that a data processing system may be configured to perform will now be discussed in further detail. For purposes of example and illustration only, the example functions are described as being performed by data processing system 302 within example system configuration 300 of FIG. 3, but it should be understood that the example functions may be performed by any computing system. To help describe some of these functions, flow diagrams may also be referenced to describe combinations of functions that may be performed. In some cases, each flow-diagram block may represent a module or portion of program code that includes instructions that are executable by at least one processor to implement specific logical functions or steps in a process. The program code may be stored on any type of computer-readable medium, such as non-transitory computer-readable media. Moreover, a person of ordinary skill in the art will appreciate that the blocks shown in the flow diagrams may be rearranged into different orders, combined into fewer blocks, separated into additional blocks, and/or removed based upon the particular embodiment.

Figure 4:
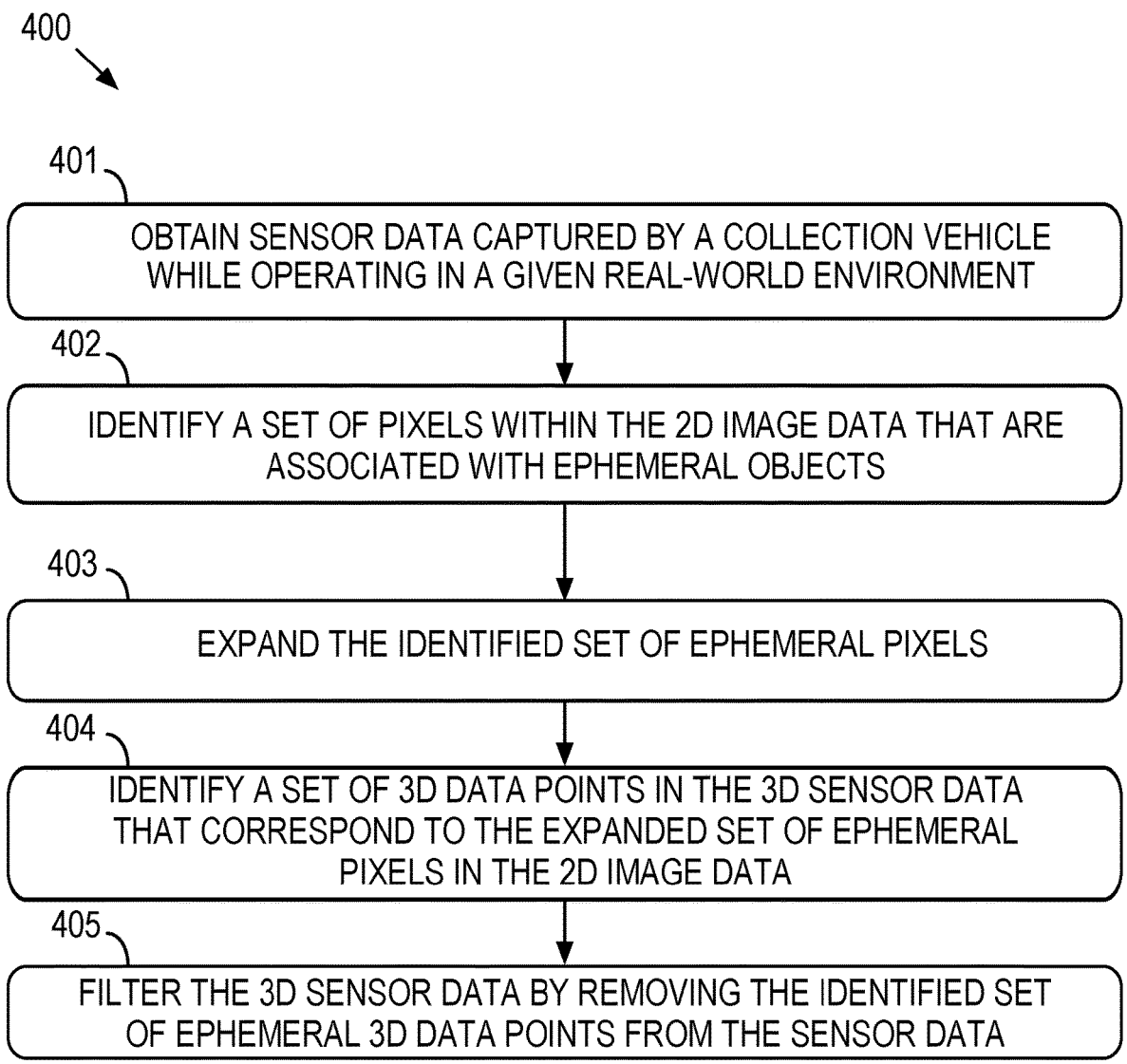
FIG. 4 depicts a flow diagram of example functions that a data processing system may be configured to perform in accordance with an example embodiment of the present disclosure.

For instance, a first method for filtering 3D sensor data to remove 3D data points associated with ephemeral objects will now be described with reference to flow diagram 400 of FIG. 4. As shown in FIG. 4, the first method may begin at block 401 with data processing system 302 obtaining sensor data captured by collection vehicle 301 while operating in a real-world environment during one or more windows of time (e.g., one or more missions). Data processing system 302 may perform this function in a variety of manners.

As one possibility, data processing system 302 may have previously received sensor data from collection vehicle 301, such as after collection vehicle 301 performed (or perhaps during the collection vehicle's performance of) a mission, in which case data processing system 302 may obtain the sensor data from data storage or the like. In this respect, the data storage from which the previously-received sensor data is accessed may be local to data processing system 302 or may be part of an external computing system that previously received the sensor data captured by collection vehicle 301 during its mission.

As another possibility, data processing system 302 may not have previously received sensor data from collection vehicle 301, in which case data processing system 302 may obtain the sensor data from collection vehicle 301 itself (e.g., via communication network 303).

Data processing system 302 may obtain sensor data captured by collection vehicle 301 in other manners as well.

Further, the sensor data that is obtained by data processing system 302 at block 401 may include 2D image data and at least one type of 3D sensor data (e.g., LIDAR data, RADAR data, and/or SONAR data), among other possible types of sensor data that may be captured by collection vehicle 301. The 2D image data and 3D sensor data may take any of various forms.

For instance, the obtained 2D image data may take the form of images that were captured by collection vehicle 301 on a frame-by-frame basis, where each frame of 2D image data corresponds to a respective capture time within the one or more windows of time and includes respective 2D image data (e.g., a respective set of one or more images) captured by one or more cameras of collection vehicle 301 at that respective capture time.

In turn, the obtained 3D sensor data may take the form of raw 3D sensor data that was captured by collection vehicle 301 on a sweep-by-sweep basis (e.g., corresponding to 360° rotations by a LIDAR device of collection vehicle 301), where each sweep of 3D sensor data corresponds to a respective range of capture times that fall within the one or more windows of time and includes a respective set of 3D sensor data captured by one or more 3D sensors (e.g., a LIDAR device) of collection vehicle 301 that represents the collection vehicle's surrounding environment during the respective range of capture times. In this respect, the respective range of capture times corresponding to a given sweep of 3D sensor data may be defined by a first capture time at which the given sweep started and a second capture time at which the given sweep stopped, although it should be understood that collection vehicle 301 and/or data processing system 302 may use a single, representative capture time to reference to the given sweep of 3D sensor data (e.g., the capture time at which the given sweep started).

Additionally or alternatively, the obtained 3D sensor data may take the form of a 3D point cloud that is generated based on raw sensor data captured by collection vehicle 301 during the one or more windows of time. In this respect, data processing system 302 (or some other computing system) may generate such a 3D point cloud using any of various techniques. For instance, as one possibility, data processing system 302 may generate a 3D point cloud by (i) obtaining data indicating a trajectory of collection vehicle 301 during the one or more windows of time (which may involve the use of techniques such as simultaneous localization and mapping (SLAM) or the like), (ii) using the data indicating the trajectory of collection vehicle 301 during the one or more windows of time to translate the raw, sweep-by-sweep 3D sensor data to an absolute coordinate system, and (iii) compiling (e.g., "stitching") the translated sweep-by-sweep 3D sensor data into a 3D point cloud that represents the entire real-world environment that collection vehicle 301 encountered during the one or more windows of time. However, data processing system 302 (or some other computing system) may generate a 3D point cloud based on raw sensor data captured by collection vehicle 301 using other techniques as well.

In line with the discussion above, it should be understood that 2D image data and 3D sensor data representative of the real-world environment may be captured during one window of time (e.g., one mission) or multiple windows of time (e.g., multiple different missions). In this respect, to the extent that 2D image data and 3D sensor data representative of the real-world environment is captured during multiple windows of time, such 2D image data and 3D sensor data may then be aggregated across the multiple windows of time on a location-by-location basis, which in turn may reduce erroneous captures of 2D image and 3D sensor data.

The 2D image data and 3D sensor data obtained by data processing system 302 may take other forms as well.

At block 402, data processing system 302 may identify a set of pixels within the 2D image data that are associated with ephemeral objects detected in the real-world environment (referred to herein as "ephemeral pixels") using a technique such as semantic segmentation. In this respect, the technology used to carry out the semantic segmentation of the 2D image data may take various forms, examples of which may include FCN and FastFCN, among other possibilities.

Further, the function of identifying the set of ephemeral pixels within the 2D image data using semantic segmentation may take various forms. As one possibility, data processing system 302 may be configured to classify each pixel within each frame as belonging to a particular type of object class (e.g., vehicle, bicycle, animal, pedestrian, plant, building, street, curb, stop light, traffic sign, sky, etc.), where each such object class may be defined as either an ephemeral class or a non-ephemeral class. For instance, vehicle, bicycle, animal, and pedestrian may be defined as ephemeral object classes, while plant, building, street, curb, stop light, traffic sign, and perhaps sky may be defined as non-ephemeral object classes (although it is also possible that the sky class may not be defined as either an ephemeral class or a non-ephemeral class). In this respect, data processing system 302 may identify the set of ephemeral pixels based on which pixels are classified as belonging to object classes that were defined as ephemeral classes.

As another possibility, instead of classifying each pixel within each frame as belonging to a particular type of object class, data processing system 302 may be configured to classify each pixel in each frame as belonging to either an ephemeral class or a non-ephemeral class, in which case data processing system 302 may identify the set of ephemeral pixels based on which pixels are classified as belonging to the ephemeral class.

The function of identifying the set of ephemeral pixels within the 2D image data using semantic segmentation may take other forms as well.

Figure 5A:
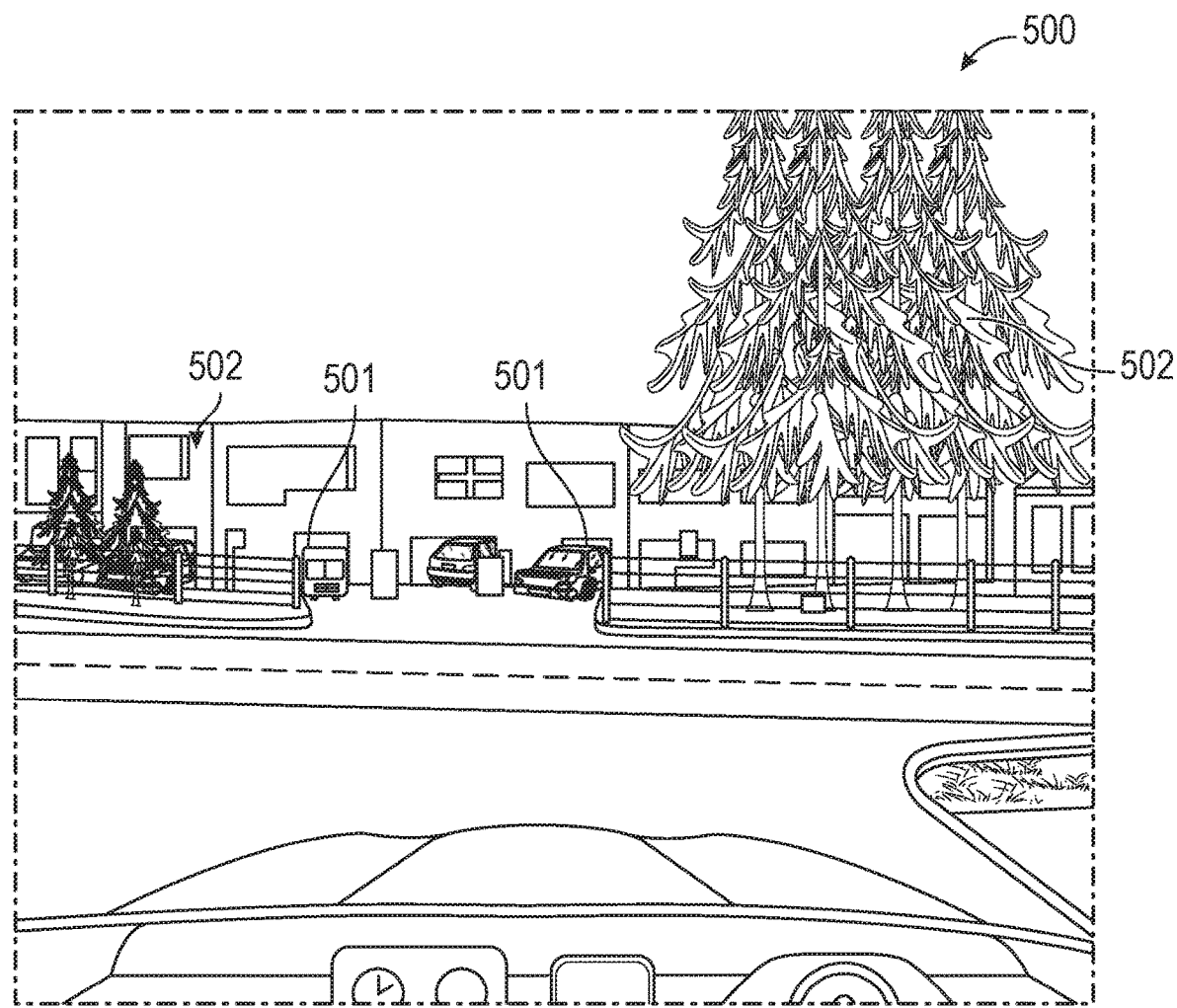
FIGS. 5A-5B depict a simplified illustration of an example of semantic segmentation.
Figure 5B:
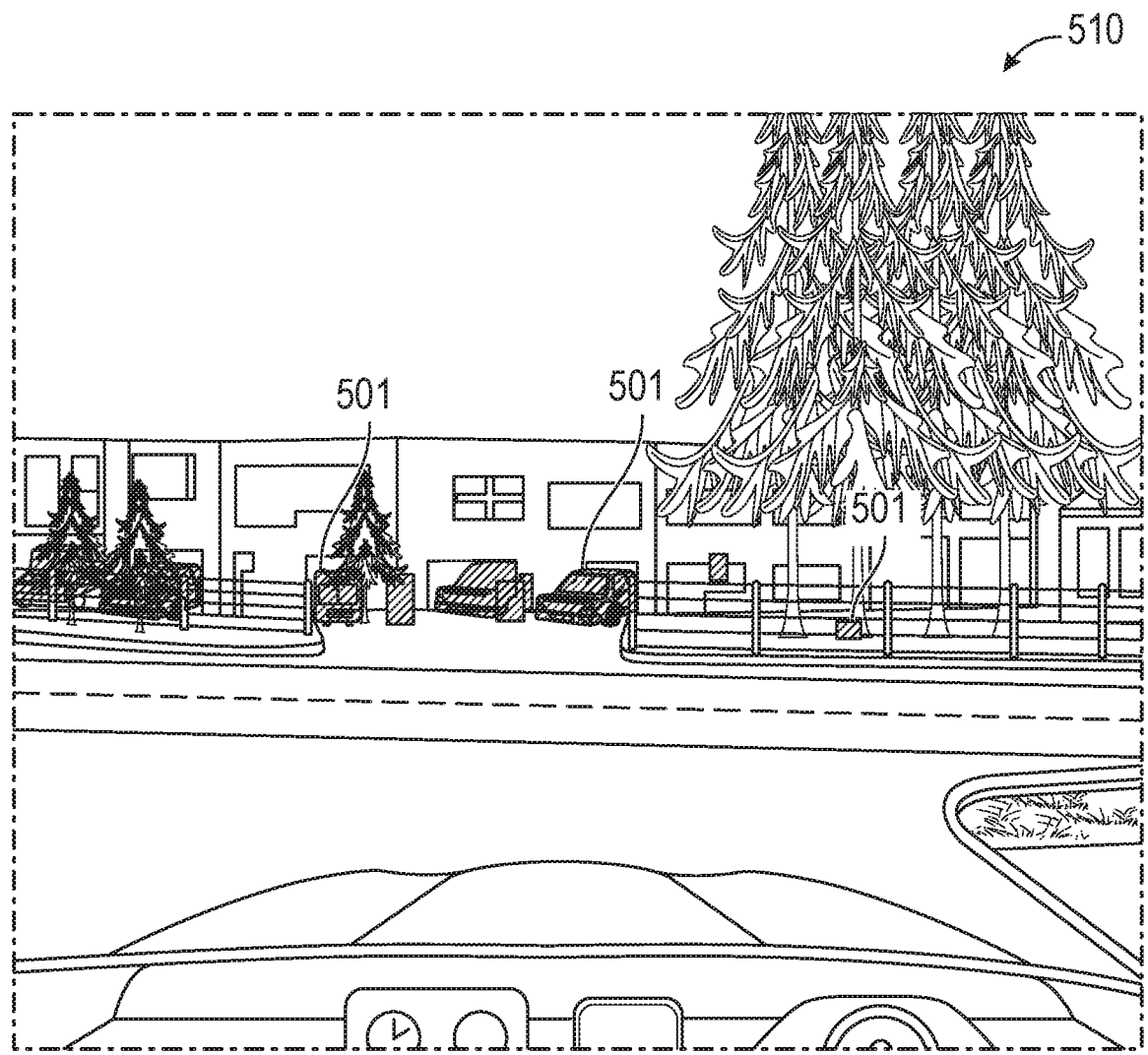

One possible example of performing semantic segmentation on 2D image data is illustrated by FIGS. 5A-B. As shown, FIG. 5A is a simplified illustration of an example image 500 captured by collection vehicle 301 that includes both ephemeral objects 501 that are not permanent to the collection vehicle's surrounding environment (e.g., other vehicles, pedestrians, etc.) and non-ephemeral objects 502 that are permanent to the collection vehicle's surrounding environment (e.g., buildings, trees, sidewalks, etc.).

After obtaining example image 500, data processing system 302 may perform semantic segmentation on example image 500 in order to identify the pixels that are associated with ephemeral objects 501, which may result in a classified version of example image 500. FIG. 5B is a simplified illustration of one possible classified image 510 that may result from performing semantic segmentation on example image 500. As shown, the pixels of example image 500 that are associated with ephemeral objects 501 have been identified as belonging to an ephemeral class and labeled with object masks. On the other hand, the pixels of example image 500 that are associated with non-ephemeral objects 502 have not been labeled.

The function of identifying the set of ephemeral pixels within the 2D image data may take other forms as well.

Once the set of ephemeral pixels within the 2D image data have been identified, data processing system 302 can use the identified set of pixels as a basis for identifying and removing 3D data points associated with ephemeral objects from the 3D sensor data. However, it has been recognized that in many cases, using only the particular set of ephemeral pixels resulting from semantic segmentation as a basis for identifying and removing 3D data points associated with ephemeral objects from the 3D sensor data may lead to some ephemeral 3D data points being overlooked, which may cause problems when the 3D sensor data is subsequently used to perform tasks such as map creation and/or localization.

Thus, at block 403, data processing system 302 may expand the set of ephemeral pixels that are identified at block 402 using a technique such as dilation, such that the set of ephemeral pixels includes additional pixels that were not previously identified at block 402 as being associated with ephemeral objects detected in the real-world environment (e.g., non-ephemeral pixels that border of the set of ephemeral pixels). In this respect, the dilation technology used to expand the set of ephemeral pixels in the 2D image data may take various forms, examples of which may include binary dilation and/or grayscale dilation, among other possibilities. Further, data processing system 302 may use any of various different dilation factors when expanding the set of ephemeral pixels.

To illustrate using the example described above in connection with FIGS. 5A-5B, data processing system 302 may expand the set of ephemeral pixels in example classified image 510 to include additional pixels located on the borders of the object masks for ephemeral objects.

Turning back to FIG. 4, at block 404, data processing system 302 may identify a set of 3D data points in the 3D sensor data that correspond to the expanded set of ephemeral pixels in the 2D image data. Data processing system 302 may perform this identification in various manners.

For instance, as one possibility, data processing system 302 may use the temporal and spatial relationship between the 3D sensor data and the 2D image data to evaluate whether each respective 3D data point in the 3D sensor data corresponds to an ephemeral pixel, and for any 3D data points that do correspond to ephemeral pixels, data processing system 302 may classify such 3D data points as ephemeral 3D data points. As another possibility, data processing system 302 may use the temporal and spatial relationship between the 3D sensor data and the 2D image data to "project" the ephemeral classification of each pixel in the expanded set of ephemeral pixels over to the corresponding 3D data point(s) in the 3D sensor data. Data processing system 302 may identify the 3D data points that correspond to the expanded set of ephemeral pixels in the 2D image data in other manners as well.

Further, depending on the approach used to identify the 3D data points that correspond to the expanded set of ephemeral pixels in the 2D image data, data processing system 302 may perform this identification at various different points during the process. For instance, in one implementation, data processing system 302 may be configured to complete the functions associated with identifying ephemeral pixels in the entire 2D image dataset before performing the function of identifying the ephemeral 3D data points. In another implementation, data processing system 302 may be configured to perform the function of identifying the ephemeral 3D data points in a more iterative manner as data processing system 302 progresses through the functions associated with identifying the ephemeral pixels in the 2D image data. For example, data processing system 302 may be configured to iterate through these functions on a frame-by-frame basis, such that once the ephemeral pixels in one frame of 2D image data have been identified, data processing system 302 may proceed to identify the 3D data points corresponding to the ephemeral pixels in that one frame of 2D image data in parallel with data processing system 302 also proceeding to identify the ephemeral pixels in another frame of 2D image data. Advantageously, this iterative implementation may enable the filtering of the 3D sensor data to be completed more quickly than an implementation where data processing system 302 waits until the functions associated with identifying the ephemeral pixels in the 2D image data are completed before performing the function of identifying the ephemeral 3D data points. Other implementations are possible as well.

Lastly, at block 405, data processing system 302 may filter the 3D sensor data by removing the identified set of ephemeral 3D data points from the 3D sensor data. Once the 3D sensor data is filtered by removing the identified set of ephemeral 3D data points from the 3D sensor data, the filtered 3D sensor data may be stored for future use and may subsequently be used for various tasks, including but not limited to map creation and localization. In this respect, as previously discussed, the filtering method described with reference to FIG. 4 provides a way to "clean" the 3D sensor data such that most (if not all) of the 3D data points associated with ephemeral objects are removed, which makes the 3D sensor data more suitable for tasks such as map creation and localization.

However, in some circumstances, it is possible that the filtering method described with reference to FIG. 4 may also result in the removal of some non-ephemeral 3D data points from the 3D sensor data as well. This removal of non-ephemeral 3D data points from the 3D sensor data may be acceptable for tasks such as map creation, but depending on the extent of non-ephemeral 3D data points that are removed, this removal of non-ephemeral 3D data points may not be acceptable for other tasks such as localization. One reason for this is that a localization process may rely on non-ephemeral 3D data points captured by a vehicle to detect that vehicle has returned to previously-visited location and then correct its position estimate accordingly (which is referred to as "loop closure"), and if too many non-ephemeral 3D data points are filtered out along with the ephemeral 3D data points, the localization process may be unable to make this correction.

Figure 6:
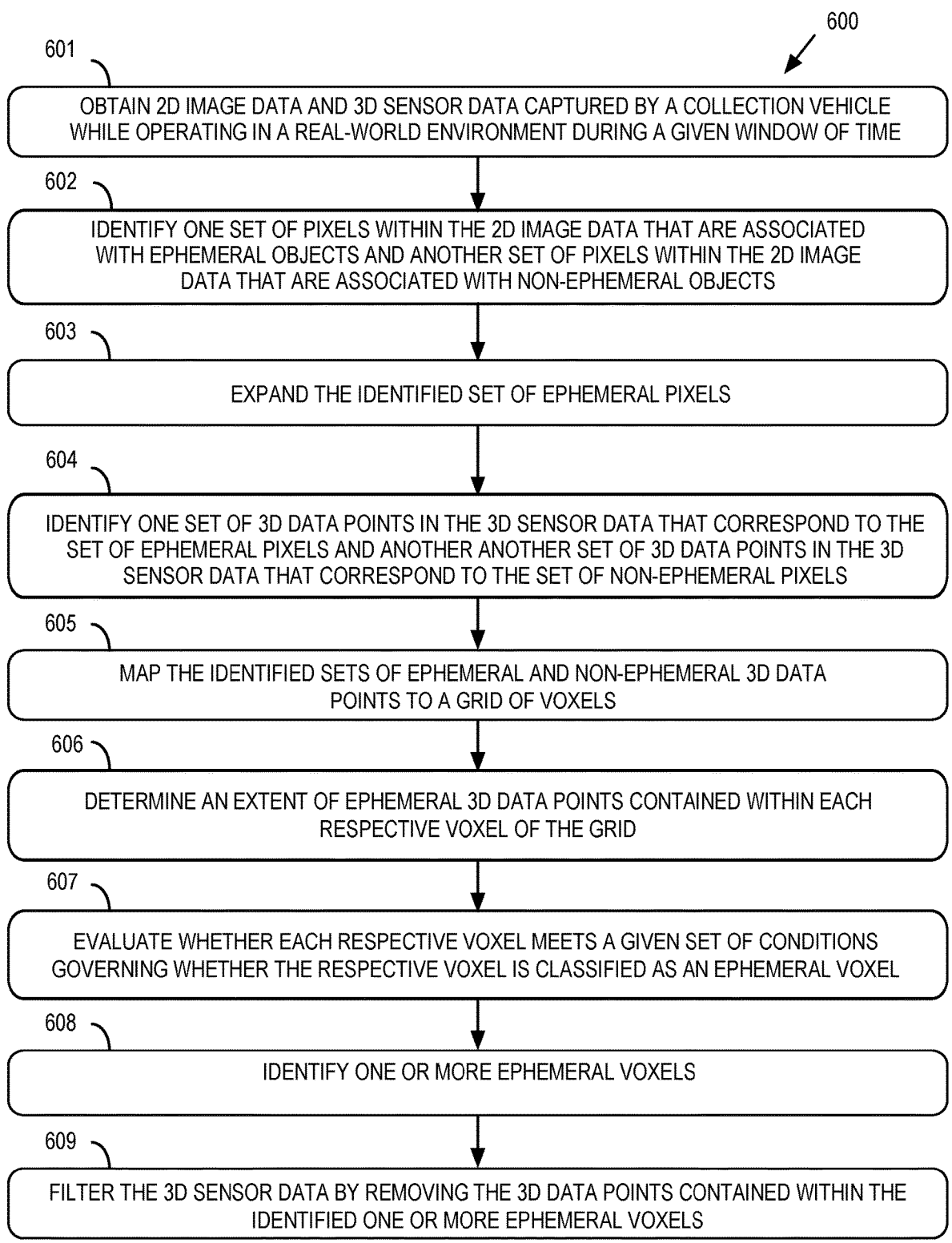
FIG. 6 depicts a flow diagram of example functions that a data processing system may be configured to perform in accordance with an example embodiment of the present disclosure.

To address this potential limitation with the first method for filtering 3D sensor data to remove 3D data points associated with ephemeral objects, also disclosed herein is a second method for filtering 3D sensor data to remove 3D data points associated with ephemeral objects, which will now be described with reference to flow diagram 600 of FIG. 6. As shown in FIG. 6, the second method may begin at block 601 with data processing system 302 obtaining sensor data (e.g., 2D image data and 3D sensor data) captured by a vehicle while operating in a real-world environment during one or more window of times. In this respect, data processing system 302 may obtain the 2D image data and 3D sensor data in any of various manners, including but not limited to the manners described above with reference to block 401 of FIG. 4. Likewise, the 2D image data and 3D sensor data may take any of various forms, including but not limited to the forms described above with reference to block 401 of FIG. 4.

At block 602, data processing system 302 may identify one set of pixels within the 2D image data that are associated with ephemeral objects detected in the real-world environment (referred to herein as "ephemeral pixels") and another set of pixels within the 2D image data that are associated with non-ephemeral objects detected in the real-world environment (referred to herein as "non-ephemeral pixels") using a technique such as semantic segmentation. In this respect, data processing system 302 may use any of various techniques to identify the sets of ephemeral and non-ephemeral pixels, including but not limited to the example techniques described above with reference to block 402 of FIG. 4.

At block 603, after identifying the set of ephemeral pixels in the 2D image data at block 602, data processing system 302 may also optionally expand the identified set of ephemeral pixels using a technique such as dilation (e.g., binary dilation, grayscale dilation, etc.), such that the set of ephemeral pixels includes additional pixels that were not previously identified at block 602 as being associated with ephemeral objects detected in the real-world environment (e.g., non-ephemeral pixels that border of the set of ephemeral pixels). In this respect, data processing system 302 may decide whether to expand the identified set of ephemeral pixels based on any of various factors, including but not limited to the extent of ephemeral pixels identified in the 2D image data, the extent of non-ephemeral pixels identified in the 2D image data, and/or the number of 3D data points include in the 3D sensor data, among other possibilities.

At block 604, data processing system 302 may identify one set of 3D data points in the 3D sensor data that correspond to the set of ephemeral pixels (referred to herein as "ephemeral 3D data points") and another set of 3D data points in the 3D sensor data that correspond to the set of non-ephemeral pixels (referred to herein as "non-ephemeral 3D data points"). Data processing system 302 may perform this function in various manners, including but not limited to manners similar to those described above with reference to block 404 of FIG. 4.

For instance, as one possibility, data processing system 302 may use the temporal and spatial relationship between the 3D sensor data and the 2D image data to evaluate whether each respective 3D data point in the 3D sensor data corresponds to an ephemeral pixel or a non-ephemeral pixel, and then based on this evaluation, classify each such 3D data point as belonging to either the set of ephemeral 3D data points or the set of non-ephemeral 3D data points. As another possibility, data processing system 302 may use the temporal and spatial relationship between the 3D sensor data and the 2D image data to "project" the ephemeral classification of each pixel in the set of ephemeral pixels and the non-ephemeral classification of each pixel in the set of non-ephemeral pixels over to the corresponding 3D data point(s) in the 3D sensor data. Data processing system 302 may identify the sets of ephemeral and non-ephemeral 3D data points in other manners as well.

Further, depending on the approach used to identify the sets of ephemeral and non-ephemeral 3D data points, data processing system 302 may perform this identification at various different points during the process. For instance, in one implementation, data processing system 302 may be configured to complete the functions associated with identifying the ephemeral and non-ephemeral pixels in the entire 2D image dataset before performing the function of identifying the ephemeral and non-ephemeral 3D data points. In another implementation, data processing system 302 may be configured to perform the function of identifying the ephemeral and non-ephemeral 3D data points in a more iterative manner as data processing system 302 progresses through the functions associated with identifying the ephemeral pixels in the 2D image data. For example, data processing system 302 may be configured to iterate through these functions on a frame-by-frame basis, such that once the ephemeral and non-ephemeral pixels in one frame of 2D image data have been identified, data processing system 302 may proceed to identify the 3D data points corresponding to the ephemeral and non-ephemeral pixels in that one frame of 2D image data in parallel with data processing system 302 also proceeding to identify the ephemeral and non-ephemeral pixels in another frame of 2D image data. Advantageously, this iterative implementation may enable the filtering of the 3D sensor data to be completed more quickly than an implementation where data processing system 302 waits until the functions associated with identifying the ephemeral and non-ephemeral pixels in the 2D image data are completed before performing the function of identifying the ephemeral and non-ephemeral 3D data points. Other implementations are possible as well.

At block 605, data processing system 302 may map the identified sets of ephemeral and non-ephemeral 3D data points to a grid of voxels, which are elements of volume that represent a 3D space. In this respect, the grid of voxels to which the identified sets of ephemeral and non-ephemeral 3D data points are mapped may take any of various forms. For example, as one possibility, each voxel in the grid may have a predefined size (e.g., 30 cm×30 cm×30 cm). As another possibility, the voxels in the grid may be dynamically sized based on a number of 3D data points included in the 3D sensor data. The grid of voxels may take other forms as well.

Further, data processing system 302 may perform this mapping function at various different points during the process. For instance, in one implementation, data processing system 302 may be configured to complete the function of identifying the ephemeral and non-ephemeral 3D data points for the entire 3D sensor dataset before performing the mapping function on the identified ephemeral and non-ephemeral 3D data points. In another implementation, data processing system 302 may be configured to perform the mapping function in a more iterative manner as data processing system 302 progresses through the function of identifying the ephemeral and non-ephemeral 3D data points in the 3D sensor data. For example, in line with the discussion above, data processing system 302 may be configured to iterate through these functions on a frame-by-frame basis, such that once the ephemeral and non-ephemeral pixels in one frame of 2D image data have been identified, data processing system 302 may proceed to identify and map the 3D data points corresponding to the ephemeral and non-ephemeral pixels in that one frame of 2D image data in parallel with data processing system 302 also proceeding to identify the ephemeral and non-ephemeral pixels in another frame of 2D image data. Other implementations are possible as well.

In line with the discussion above, it should be understood that data processing system 302 may perform the functions of blocks 601-605 in connection with sensor data captured during one window of time (e.g., one mission) or multiple windows of time (e.g., multiple different missions).

At block 606, data processing system 302 may determine an extent of ephemeral 3D data points contained within each respective voxel of the grid (or at least a subset thereof) and accumulate this information into a dataset that may be referred to as the "voxel statistics" for the 3D sensor data. In this respect, the extent of ephemeral 3D data points contained within any given voxel may take various forms and be determined in various manners. For instance, as one possibility, the determined extent of ephemeral 3D data points contained within a given voxel may take the form of a ratio between ephemeral 3D data points and non-ephemeral 3D data points contained within the given voxel. For example, such a ratio may be represented in terms of a numerical count of ephemeral 3D data points contained within the given voxel as compared to a numerical count of non-ephemeral 3D data points contained within the given voxel. As another example, such a ratio may be represented in terms of a percentage of 3D data points within the given voxel that are ephemeral 3D data points, which may be calculated by dividing the numerical count of ephemeral 3D data points contained within the given voxel by the total numerical count of both ephemeral and non-ephemeral 3D data points contained within the given voxel. A ratio between ephemeral 3D data points and non-ephemeral 3D data points contained within the given voxel may take other forms as well. As another possibility, the determined extent of ephemeral 3D data points contained within a given voxel may take the form of a numerical count of ephemeral 3D data points contained within the given voxel without reference to a numerical count of non-ephemeral 3D data points contained within the given voxel. The extent of ephemeral 3D data points contained within a given voxel may take other forms and be determined in other manners as well.

Further, data processing system 302 may perform this function of determining the voxel statistics at various different points during the process. For instance, in one implementation, data processing system 302 may be configured to complete the functions of identifying and mapping the sets of ephemeral and non-ephemeral 3D data points for the entire 3D sensor dataset before performing determining the voxel statistics. In another implementation, data processing system 302 may be configured to perform the function of determining the voxel statistics in a more iterative manner as data processing system 302 progresses through the function of identifying and mapping the sets of ephemeral and non-ephemeral 3D data points in the 3D sensor data. For example, in line with the discussion above, data processing system 302 may be configured to iterate through these functions on a frame-by-frame basis, such that once the 3D data points corresponding to the ephemeral and non-ephemeral pixels in one frame of 2D image data have been identified and mapped, data processing system 302 may update the voxel statistics to reflect these newly-identified and mapped 3D data points in parallel with data processing system 302 also proceeding to identify and map 3D data points corresponding to the ephemeral and non-ephemeral pixels in another frame of 2D image data. Other implementations are possible as well.

At block 607, based on the voxel statistics, data processing system 302 may evaluate whether each respective voxel in the grid (or at least a subset thereof) meets a given set of one or more conditions governing whether the respective voxel is classified as an ephemeral voxel. In this respect, the given set of one or more conditions that govern whether a respective voxel is classified as an ephemeral voxel may take various forms.

In one embodiment, the given set of one or more conditions governing whether a respective voxel is classified as an ephemeral voxel may include at least the following two conditions: (i) that the respective voxel contains a threshold extent of ephemeral 3D data points, and (ii) that the respective voxel has a threshold extent of surrounding voxels that each also contain a threshold extent of ephemeral 3D data points.

In such an embodiment, the voxels in the grid that are considered to be surrounding voxels may take various forms. For instance, at a minimum, a given voxel's surrounding voxels may comprise the voxels that are adjacent to the given voxel. In this respect, it should be understood that each voxel in the grid may have up to 26 adjacent voxels—eight corner voxels, twelve edge voxels, and six surface voxels—although a given voxel's total number of adjacent voxels may vary depending on its position within the grid (e.g., voxels on the outside of the grid have less adjacent voxels). Additionally, a given voxel's surrounding voxels may also comprise voxels that are adjacent to the given voxel's adjacent voxels (e.g., voxels that are at least one voxel away from the given voxel). Similarly, a given voxel's surrounding voxels may include voxels that are two or more voxels away from the given voxel. The voxels in the grid that are considered to be surrounding voxels may take various other forms as well.

Further, in such an embodiment, the threshold extent of ephemeral 3D data points may take any of various forms. For instance, as one possibility, the threshold extent of ephemeral 3D data points may take the form of a threshold percentage of ephemeral 3D data points contained within the respective voxel (e.g., a minimum of 40% ephemeral 3D data points). As another possibility, the threshold extent of ephemeral 3D data points may take the form of a threshold number of ephemeral 3D data points contained within the respective voxel (e.g., a minimum of 100 ephemeral 3D data points). As yet another possibility, the threshold extent of ephemeral 3D data points may take the form of a threshold difference between the numerical count of ephemeral 3D data points contained within the respective voxel and the numerical count of non-ephemeral 3D data points contained within the respective voxel (e.g., a minimum value defining how much the numerical count of ephemeral 3D data points must exceed the numerical count of non-ephemeral 3D data points or a maximum value defining how much the numerical count of non-ephemeral 3D data points is permitted to exceed the numerical count of ephemeral 3D data points). The threshold extent of ephemeral 3D data points may take other forms as well. Further, it should be understood that the threshold extent of ephemeral 3D data points may either be a fixed value or may be dynamically set based on various factors (e.g., the extent of pixels and/or 3D data points that have been classified, the density of 3D data points, etc.).

Likewise, the threshold extent of surrounding voxels that also each contain the threshold extent of ephemeral 3D data points may take any of various forms. For instance, as one possibility, the threshold extent of surrounding voxels that also each contain the threshold extent of ephemeral 3D data points may take the form of a threshold number of adjacent voxels that also each contain the threshold extent of ephemeral 3D data points (e.g., a minimum of 3 adjacent voxels contain the threshold extent of ephemeral 3D data points). As another possibility, the threshold extent of adjacent voxels that also each contain the threshold extent of ephemeral 3D data points may take the form of a threshold percentage of adjacent voxels that also each contain the threshold extent of ephemeral 3D data points (e.g., a minimum of 50% of the adjacent voxels contain the threshold extent of ephemeral 3D data points). The threshold extent of surrounding voxels that also each contain the threshold extent of ephemeral 3D data points may take other forms as well. Further, it should be understood that the threshold extent of surrounding voxels that also each contain the threshold extent of ephemeral 3D data points may either be a fixed value or may be dynamically set based on various factors (e.g., the extent of pixels and/or 3D data points that have been classified, the density of 3D data points, etc.).

To illustrate with an example, consider an example voxel that is determined to contain 15 ephemeral 3D data points and 30 non-ephemeral 3D data points. In line with the discussion above, data processing system 302 may first evaluate whether the percentage of ephemeral 3D data points contained in this example voxel—which is 33% since 15 out of the total 45 3D data points have been identified as ephemeral—is above a threshold percentage of ephemeral 3D data points. In this respect, if the threshold percentage of ephemeral 3D data points is 40%, data processing system 302 would identify the example voxel as a non-ephemeral voxel because the threshold percentage of ephemeral 3D data points was not satisfied.

On the other hand, if the threshold percentage is 30%, then data processing system 302 would determine that the example voxel satisfies the first condition and then evaluate whether the example voxel has a threshold extent of surrounding voxels that also contain the threshold percentage of ephemeral 3D data points (e.g., 30%). In this respect, data processing system 302 may have evaluated each of the example voxel's surrounding voxels similarly to the example voxel (e.g., by evaluating whether the percentage of ephemeral 3D data points is above the threshold percentage), and based on this evaluation, may determine whether a threshold number of the example voxel's surrounding voxels contain a percentage of ephemeral 3D data points that is above the threshold percentage. In this example, if the threshold number of surrounding voxels that also meet the first condition is three voxels, then as long as three of the example voxel's surrounding voxels have a percentage of ephemeral 3D data points that exceeds the threshold percentage, then the second condition is satisfied and data processing system 302 identifies the example voxel as ephemeral. Many other examples are possible as well.

In addition to the two conditions discussed above, the given set of one or more conditions that govern whether a respective voxel is classified as an ephemeral voxel may include other conditions as well. For instance, one such condition may be that the respective voxel must contain a threshold number of total 3D data points (e.g., at least 20 data points) in order to be deemed an ephemeral voxel, which may help avoid the removal of 3D data points from the 3D sensor data based on an insufficient sample size. Another such condition may be that the threshold extent of surrounding voxels must satisfy both the condition of containing the threshold extent of ephemeral 3D data points and also the condition of containing a threshold number of total 3D data points. Other conditions for determining whether a respective voxel is classified as an ephemeral voxel are possible as well.

At block 608, based on the evaluation of block 607, data processing system 302 may identify one or more ephemeral voxels for removal from the 3D sensor data. In this respect, the function of identifying the one or more ephemeral voxels may involve labeling the 3D data points in the identified one or more ephemeral voxels for removal, among other possibilities.

At block 609, after identifying the one or more ephemeral voxels, data processing system 302 may filter the 3D sensor data by removing the 3D data points contained within the identified one or more ephemeral voxels. In practice, this function of removing the 3D data points may take various forms, including but not limited to (i) deleting the data points from the 3D sensor data, (ii) moving the data points out of the 3D sensor data and storing them for later processing, or (iii) replacing the data points with other data points from the same location, but obtained from a different mission conducted by collection vehicle 301. The function of removing the 3D data points from the 3D sensor data may also take other forms.

Figure 7A:
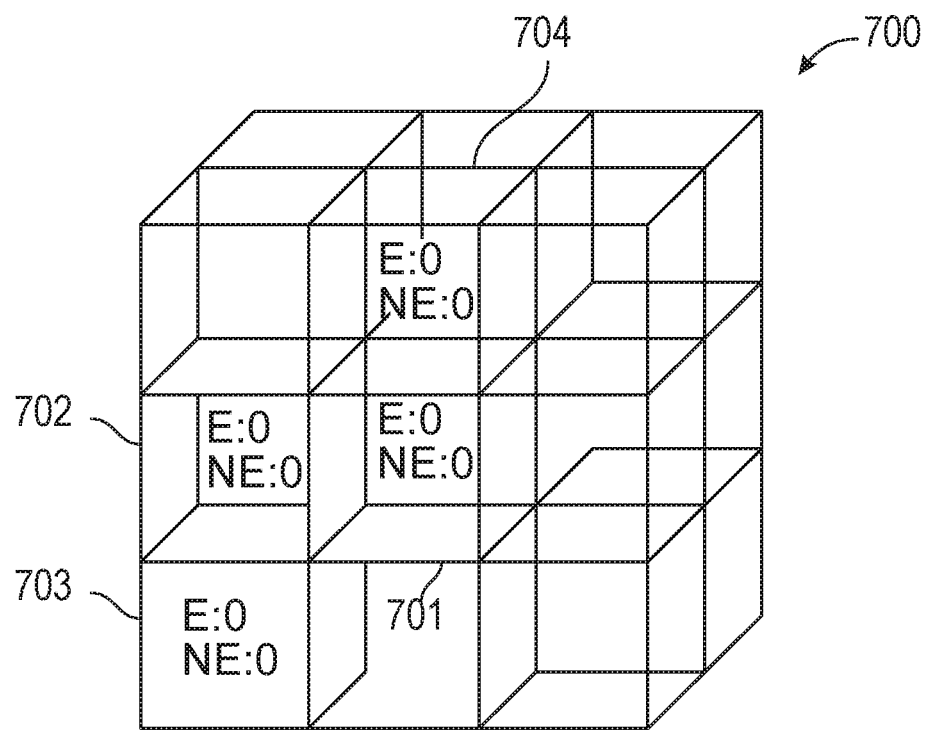
FIGS. 7A-7C depict example visualizations of a grid of voxels.

One illustrative example of the second filtering method will now be discussed with reference to FIGS. 7A-7C, which shows an example visualization 700 of a voxel grid at three different points during the above process. For instance, FIG. 7A depicts the visualization 700 of the voxel grid containing voxels 701, 702, 703, and 704 at a first point during the filtering process, which is prior to any classification of the 3D data points and thus shows that each voxel in the grid has a count of zero ephemeral 3D data points and zero non-ephemeral 3D data points. This is depicted with zero next to an "E" for ephemeral 3D data points, and a zero next to an "NE" for non-ephemeral 3D data points.

Figure 7B:
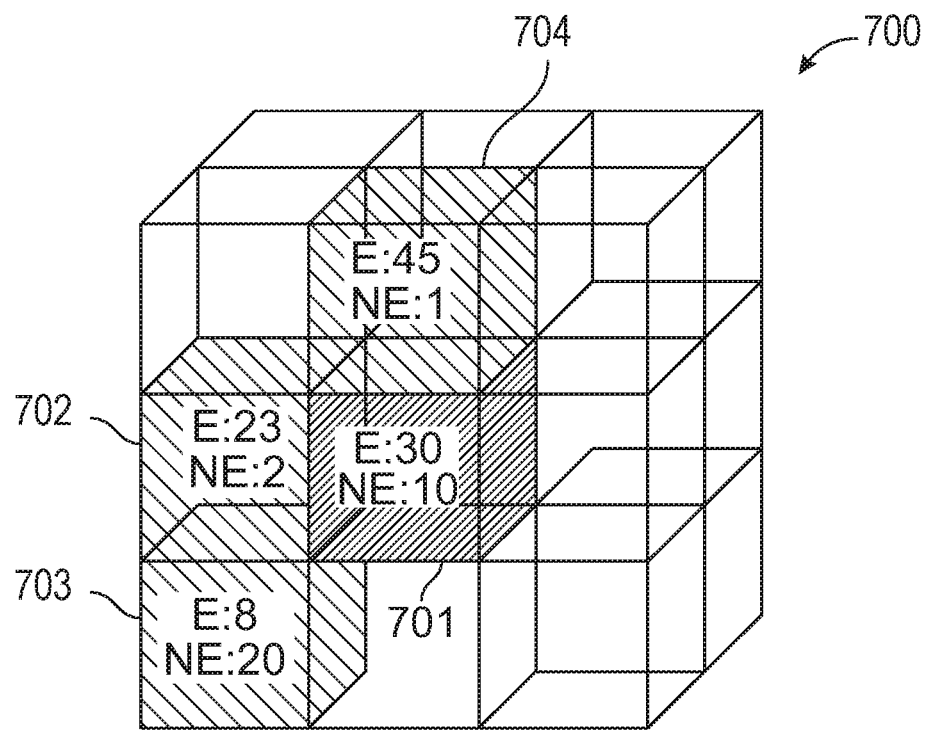

Next, FIG. 7B depicts visualization 700 of the voxel grid at a second point during the process, which is after the classification of the 3D data points has begun but before the classification of the 3D data points has completed. The count of ephemeral 3D data points and non-ephemeral 3D data points continues to grow as more 2D image data is classified and associated with 3D data points. As shown, at this point in the process, voxel 701 contains 30 ephemeral 3D data points and 10 non-ephemeral 3D data points, voxel 702 contains 23 ephemeral 3D data points and two non-ephemeral 3D data points, voxel 703 contains eight ephemeral 3D data points and 20 non-ephemeral 3D data points, and voxel 704 contains 45 ephemeral 3D data points and one non-ephemeral 3D data point.

Figure 7C:
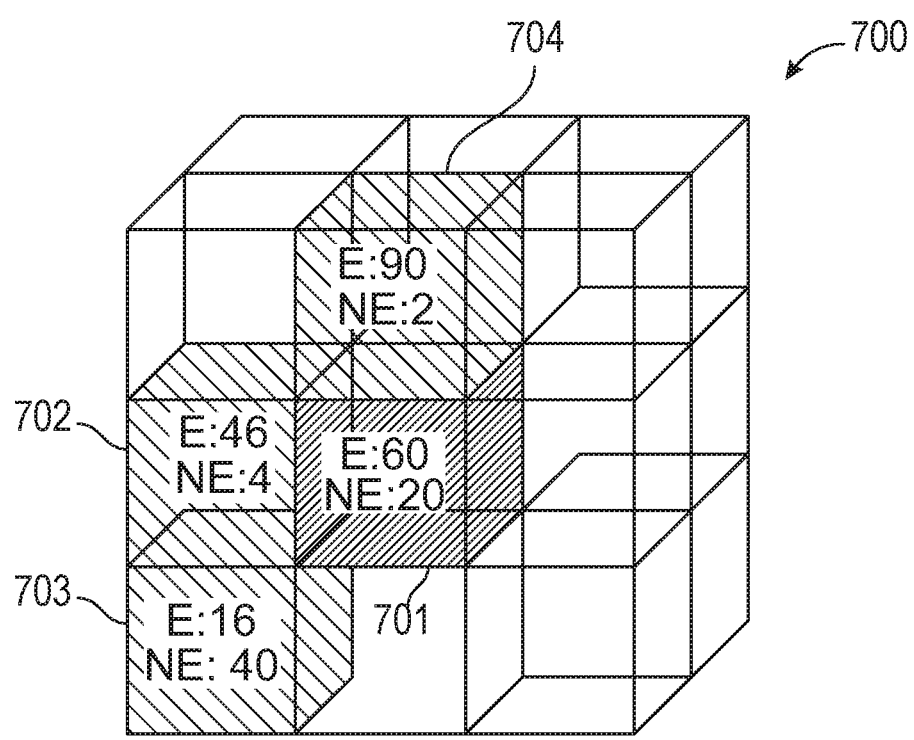

Lastly, FIG. 7C depicts visualization 700 of the voxel grid at a third point during the process, which is after the classification of the 3D data points has completed. Visualization 700 of FIG. 7C depicts the final populated grid of voxels with a count of ephemeral 3D data points and non-ephemeral 3D data points. As shown, at this point in the process, voxel 701 contains 60 ephemeral 3D data points and 20 non-ephemeral 3D data points, voxel 702 contains 46 ephemeral 3D data points and four non-ephemeral 3D data points, voxel 703 contains 16 ephemeral 3D data points and 40 non-ephemeral 3D data points, and voxel 704 contains 90 ephemeral 3D data points and two non-ephemeral 3D data points.

Using these final voxel statistics for the grid of voxels, data processing system 302 may then carry out the functions of blocks 607-609 of FIG. 6. For instance, data processing system 302 can use the respective counts of ephemeral and non-ephemeral 3D data points for each of voxels 701, 702, 703, and 704 to evaluate whether any of these voxels meet the conditions that are required to be classified as an ephemeral voxel. For example, if the given set of one or more conditions require a voxel to contain a minimum of 25% ephemeral 3D data points and have a minimum of three surrounding voxels that each also contain a minimum of 25% ephemeral 3D data points, data processing 302 may identify voxel 701 as an ephemeral voxel because it has 75% ephemeral 3D data points and because voxels 702, 703, and 704 have 92% ephemeral 3D data points, 28% ephemeral 3D data points, and 98% ephemeral 3D data points, respectively. After identifying voxel 701 as an ephemeral voxel, data processing system 302 can proceed to filter the 3D sensor data by removing the 3D data points in voxel 701.

Figure 8:
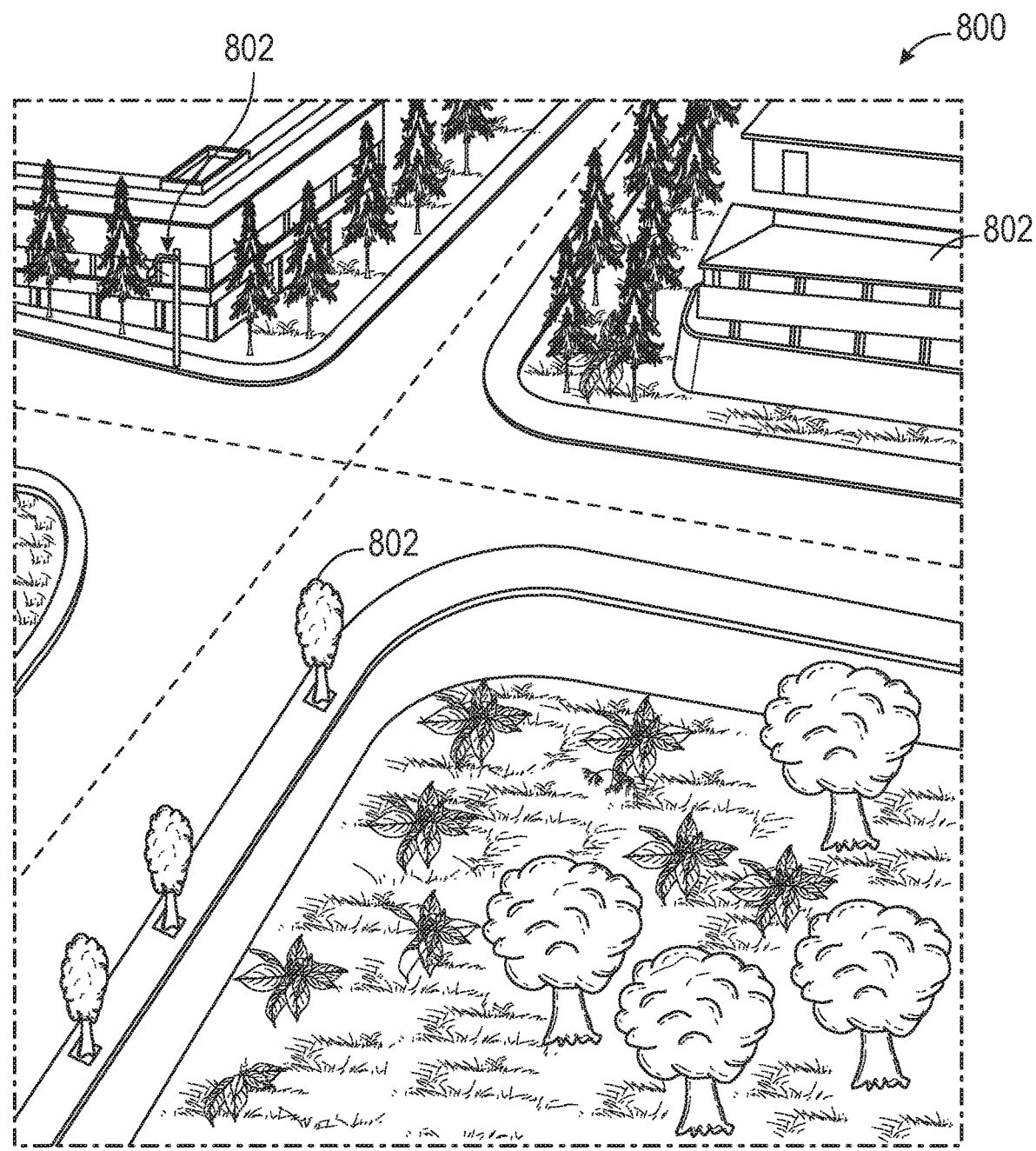
FIG. 8 depicts an example map created based on 3D sensor data that has been filtered in accordance with an example embodiment of the present disclosure.

After data processing system 302 filters the 3D sensor data at block 609 by removing the 3D data points contained within the one or more identified ephemeral voxels, the filtered 3D sensor data may be stored for future use and may subsequently be used for various tasks, including but not limited to map creation and localization. For example, one possible example of a map that may be created based on 3D sensor data that has been filtered using the method described with reference to FIG. 6 is shown in FIG. 8, which depicts an example map 800 that is substantially similar to visualization 200 of FIG. 2. As shown, non-ephemeral objects 802 such as trees and buildings are still included in example map 800, but ephemeral objects such as vehicles have been removed.

Advantageously, the second filtering method described with reference to FIG. 6 provides another way to "clean" the 3D sensor data such that most (if not all) of the 3D data points associated with ephemeral objects are removed, which makes the 3D sensor data more suitable for tasks such as map creation and localization. Moreover, the second filtering method described with reference to FIG. 6 may also reduce the extent of non-ephemeral 3D data points that are unintentionally removed during the filtering of the ephemeral 3D data points, which may have the added benefit of further improving the quality of localization—particularly for loop closures.

Figure 9:
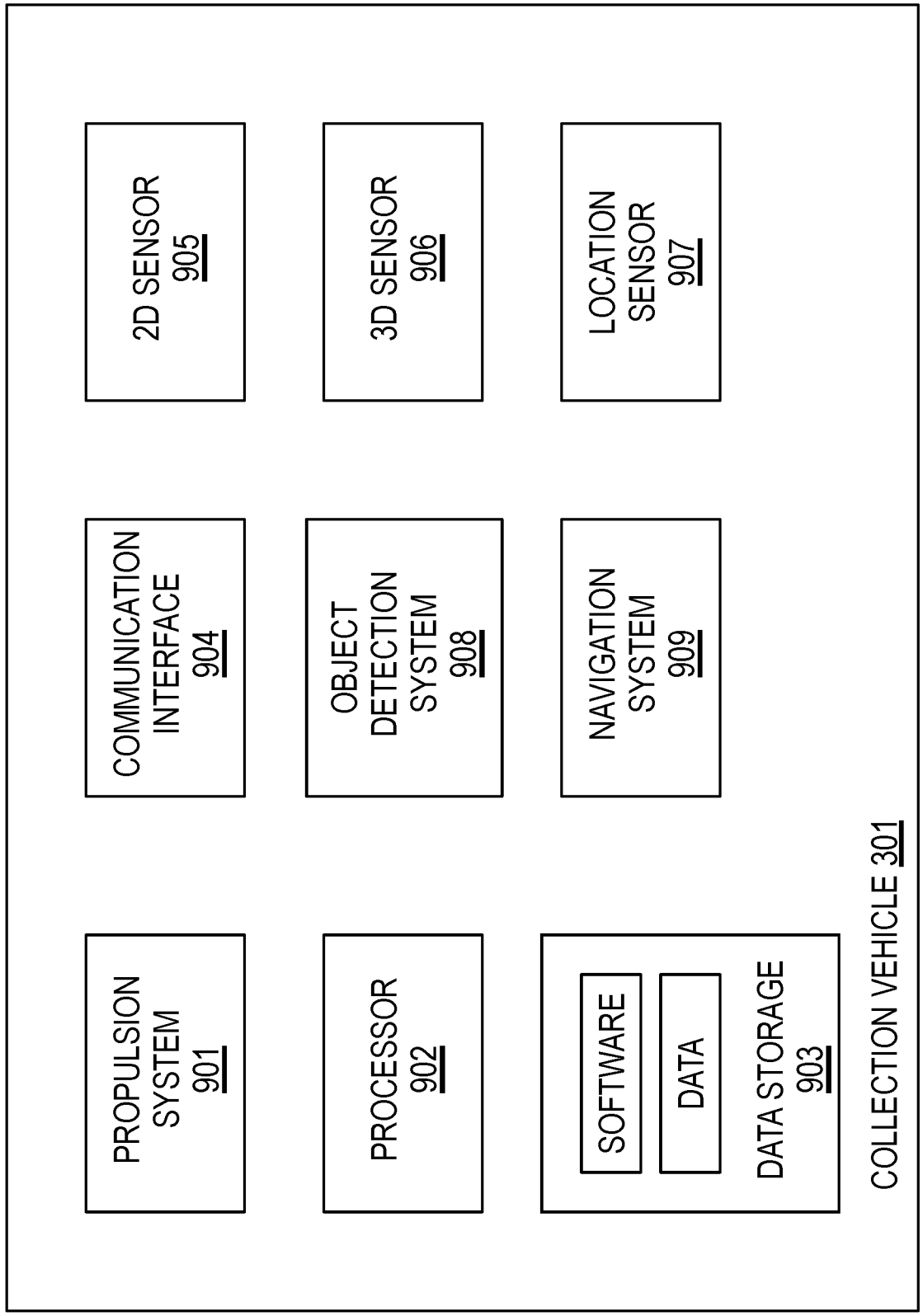
FIG. 9 depicts a simplified block diagram of an example collection vehicle.

Turning now to FIG. 9, a simplified block diagram of certain structural details of collection vehicle 301 of FIG. 3 is illustrated. As noted above, collection vehicle 301 may take the form of an autonomous vehicle, a semi-autonomous vehicle, or a manually-driven vehicle. In scenarios where collection vehicle 301 takes the form of a vehicle that does not include autonomous or semi-autonomous technology, certain of the systems and/or components discussed below may not be present.

As shown, collection vehicle 301 includes a propulsion system 901 that generally comprises a chassis and a set of wheels coupled to a drivetrain that links the set of wheels to an engine (e.g., an internal combustion or electric engine), which produces power that causes the set of wheels to rotate, thereby allowing collection vehicle 301 to drive (e.g., fully- or semi-autonomously or manually) through real-world environments. Collection vehicle 301 includes a variety of additional systems and components that generally facilitate this functionality, combinations of which are mechanically and/or communicatively linked.

For instance, collection vehicle 301 includes at least one processor 902 that is configured to execute software stored on data storage 903, thereby providing collection vehicle 301 with the capability of performing various traditional vehicle functions, various autonomous or semi-autonomous functions, and/or various other functions disclosed herein. Processor 902 may comprise one or more processor components that may include one or more of (i) a general-purpose processor (e.g., a microprocessor), (ii) a special-purpose processor (e.g., an application-specific integrated circuit, a digital signal processor, a graphics processing unit, a vision processing unit, etc.), (iii) a programmable logic device (e.g., a field-programmable gate array), or (iv) a controller (e.g., a microcontroller), among other possibilities. Data storage 903 may comprise one or more non-transitory computer-readable mediums that may include one or more of (i) a volatile medium (e.g., random-access memory, a register, a cache, a buffer, etc.) or a non-volatile medium (e.g., read-only memory, a hard-disk drive, a solid-state drive, flash memory, an optical disk, etc.). In turn, data storage 903 may be provisioned with software that may take the form of program instructions that are executable by processor 902 such that collection vehicle 301 is configured to perform various traditional vehicle functions, various autonomous or semi-autonomous functions, and/or various other functions disclosed herein. Data storage 903 may further store a variety of data in one or more databases, file systems, or other information depositories. Such data may include sensor data captured or otherwise sensed by collection vehicle 301, geometric maps, semantic maps, navigation data, traffic data, 3D models, object-detection models, etc.

Collection vehicle 301 also includes at least one communication interface 904 that is configured to facilitate communication between collection vehicle 301 and other entities, such as other vehicles, data processing system 302, and/or a ride-share dispatch system, among other possibilities. Communication interface 904 may include one or more of (i) a wired communication interface (e.g., an Ethernet interface, a serial bus interface such as Firewire or USB, etc.) or (ii) a wireless communication interface (e.g., a chipset-antenna pair configured for wireless communication, a wireless NIC, a WiFi adapter, a cellular network adapter, etc.). In practice, communication interface 904 may include multiple interfaces of different types. For example, collection vehicle 301 may include (i) a wired interface configured to (a) transfer sensor data to data processing system 302 and (b) receive map data, object-detection models, etc. from data processing 302, (ii) a first wireless interface configured for vehicle-to-vehicle communications (e.g., a short-range wireless interface), and (iii) a second wireless interface configured to communicatively couple collection vehicle 301 to a cloud system, such as a ride-share dispatch system or data processing system 302 (e.g., a WAN wireless interface), among other possibilities.

Collection vehicle 301 further includes a variety of sensors that capture data representing the collection vehicle's surroundings and that facilitate autonomous operations, such as at least one 2D sensor 905, at least one 3D sensor 906, and at least one location sensor 907, each of which is generally configured to detect one or more particular stimuli from the collection vehicle's real-world environment and then output data indicative of one or more measured values of the one or more stimuli at a given capture time or range of capture times. In practice, each sensor may have a respective capture or sampling rate that may differ from other sensor's rates.

Two-dimensional sensor 905 may include one or more 2D sensors that are configured to capture 2D data (e.g., 2D images) representative of the collection vehicle's surroundings. Examples of 2D sensors may include 2D cameras, 2D radars, 2D sonars, 2D ultrasound sensors, and 2D scanners, among other possibilities. Two-dimensional sensor 905 may be equipped with visible-light and/or infrared sensing capabilities, among other possibilities. In example implementations, 2D sensor 905 may include a set of 2D sensors arranged in a manner such that the 2D sensors collectively provide a 360° view of the collection vehicle's surroundings, such as a set of 6 or 7 cameras. Other arrangements are also possible.

Three-dimensional sensor 906 may include one or more 3D sensors that are configured to capture 3D data (e.g., LIDAR data) representative of the collection vehicle's surroundings. Examples of 3D sensors may include LIDAR devices, 3D radar devices, 3D sonar devices, 3D ultrasound devices, and camera arrays equipped for stereo vision and/or visual SLAM, among other possibilities. In example implementations, 3D sensor 906 may include one or more 3D sensors arranged in a manner such that the one or more 3D sensors collectively provide a 360° view of the collection vehicle's surroundings. Other arrangements are also possible.

Location sensor 907 may include one or more sensors that are configured to detect a position, orientation, and/or heading of collection vehicle 301. More specifically, these one or more sensors may facilitate determining the collection vehicle's geolocation, velocity, acceleration, and/or other motions states. Examples of location sensors may include inertial measurement units (IMUs), global navigation satellite system (GNSS) receivers, accelerometers, gyroscopes, and magnetometers, among other possibilities.

Collection vehicle 301 further includes an object-detection system 908 that is generally configured to help collection vehicle 301 to perceive its surroundings, place itself within a given map, and autonomously navigate and drive. To these ends, object-detection system 908 may analyze data from various 2D sensors 905, 3D sensors 906, and/or location sensors 907 and facilitate collection vehicle 301 making determinations based on that analysis. For instance, object-detection system 908 may include one or more trained object-detection models, each of which may be configured to take as input 2D and/or 3D sensor data captured by collection vehicle 301 and output a likelihood that the sensor data captured one or more instances of an object that the given object-detection model was trained to detect. Object-detection system 908 may include other components and functionality as well.

Collection vehicle 301 also includes a navigation system 1009 that may utilize information from object-detection system 908 and/or from one or more of the collection vehicle's sensors to facilitate autonomously navigating collection vehicle 301. To this end, navigation system 909 may also utilize various other information that may be stored locally on collection vehicle 301 and/or provided in real-time to collection vehicle 301 by other entities, such as map, traffic, weather, and navigation information.

Propulsion system 901, object-detection system 908, and navigation system 909 may collectively function to facilitate collection vehicle 301 autonomously driving through and performing other operations in real-world environments.

A person of ordinary skill in the art will appreciate that FIG. 9 is but one example arrangement of components of a collection vehicle and that numerous other arrangements are also possible and contemplated herein. For example, collection vehicles may include additional components not illustrated in FIG. 10 and/or more or fewer of the illustrated components.

FIG. 10 depicts a simplified block diagram of certain structural details of data processing system 302 of FIG. 3. In practice, data processing system 302 may include one or more computing systems (e.g., one or more servers, one or more mainframe computers, one or more desktop computers, etc.) that collectively include at least one processor 1001, data storage 1002, and at least one communication interface 1003. Moreover, data processing system 302 may optionally include at least one input interface 1004 and/or at least one output interface 1005. In any case, each of these components may be communicatively connected by link 1006 that may take the form of a system bus, communication network, or some other connection mechanism.

Processor 1001 may comprise one or more processor components that may include one or more of (i) a general-purpose processor (e.g., a microprocessor), (ii) a special-purpose processor (e.g., an application-specific integrated circuit, a digital signal processor, a graphics processing unit, a vision processing unit, etc.), (iii) a programmable logic device (e.g., a field-programmable gate array), or (iv) a controller (e.g., a microcontroller), among other possibilities. In practice, these one or more processor components may be part of a single computing device or distributed across multiple physical computing devices that are connected via a network or the like.

Data storage 1002 may comprise one or more non-transitory computer-readable mediums that may include one or more of (i) a volatile medium (e.g., random-access memory, a register, a cache, a buffer, etc.) or a non-volatile medium (e.g., read-only memory, a hard-disk drive, a solid-state drive, flash memory, an optical disk, etc.). In practice, these one or more storage mediums may be part of a single computing device or distributed across multiple physical computing devices that are connected via a network or the like.

As shown in FIG. 10, data storage 1002 may be provisioned with software that provides data processing system 302 with the capability to perform various functions disclosed herein (e.g., the functions discussed above with reference to FIGS. 4 and 6). In this respect, the software may take the form of program instructions that are executable by processor 1001 such that data processing system 302 is configured to perform the various functions disclosed herein. As also shown in FIG. 10, data storage 1002 may further store a variety of data in one or more databases, file systems, or other information depositories. Such data may include sensor data captured by collection vehicles, 3D point clouds, 2D object tracks, 3D object tracks, object data structures, geometric maps, semantic maps, data indicative of object trajectories, files for generated time-aggregated, 3D visualizations of real-world environments, training data for object-detection models, trained object-detection models, etc.

Communication interface 1003 may include one or more communication interfaces that are configured to facilitate communication with other entities, such as collection vehicles and curator client stations. These one or more communication interfaces may include one or more of (i) a wired communication interface (e.g., an Ethernet interface, a serial bus interface such as Firewire or USB, etc.) or (ii) a wireless communication interface (e.g., a chipset-antenna pair configured for wireless communication, a wireless NIC, a WiFi adapter, a cellular network adapter, etc.). In practice, communication interface 1103 may include multiple interfaces of different types (e.g., a wired interface configured to obtain information from collection vehicles and a wireless interface configured to communicate with curator client stations via one or more LANs and/or WANs of network 304).

Input interface 1004 may include one or more input interfaces configured to allow user interaction with data processing system 302 (e.g., for local annotations or other local curation tasks). In this regard, these one or more input interfaces may include one or more of a keyboard, a mouse, a trackpad, a touch-sensitive surface, a stylus, a microphone, a camera, a video camera, or a scanner, among other possibilities.

Output interface 1005 may include one or more output interfaces configured to provide output to a user of data processing system 302 (e.g., local display of time-aggregated, 3D visualizations). These one or more output interfaces may include one or more of a display screen, a speaker system, or a printer, among other possibilities.

A person of ordinary skill in the art will appreciate that FIG. 10 is but one example arrangement of components of a data processing system and that numerous other arrangements are also possible and contemplated herein. For example, data processing systems may include additional components not illustrated in FIG. 10 and/or more or fewer of the illustrated components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

What is claimed is:

1. A computer-implemented method comprising:
    obtaining, using one or more sensors, two-dimensional (2D) image data and three-dimensional (3D) sensor data that is representative of an area;
    identifying, by a processor within the 2D image data, a first set of pixels associated with ephemeral objects that are dynamic objects and a second set of pixels associated with non-ephemeral objects that are static objects;
    identifying, by the processor within the 3D sensor data, ephemeral 3D data points associated with the ephemeral objects and non-ephemeral 3D data points associated with the non-ephemeral objects;
    mapping, by the processor, the ephemeral 3D data points and the non-ephemeral data points to a grid of voxels;
    responsive to determining that one or more voxels in the grid include a threshold extent of ephemeral 3D data points, filtering the 3D sensor data to remove associated ones of the ephemeral 3D data points within the one or more voxels.

2. The computer-implemented method of claim 1, further comprising:
    determining whether the one or more voxels have a threshold extent of surrounding voxels that surround the one or more voxels and include the threshold extent of ephemeral 3D data points, and
    wherein filtering is further based on the surrounding voxels.

3. The computer-implemented method of claim 2, further comprising:
    determining whether the one or more voxels each contain a threshold number of total 3D data points, and
    wherein the filtering is further based on the total 3D data points.

4. The computer-implemented method of claim 3, wherein the threshold extent of surrounding voxels that include the threshold extent of ephemeral data points are also required to contain the threshold number of total 3D data points.

5. The computer-implemented method of claim 1, wherein determining whether the one or more voxels include the threshold extent of ephemeral 3D data points comprises, for each of the one or more voxels:
    determining a ratio between the ephemeral 3D data points and the non-ephemeral 3D data points within an individual one of the one or more voxels; and
    determining whether the ratio between exceeds a threshold ratio.

6. The computer-implemented method of claim 1, wherein identifying the first set of pixels and the second set of pixels comprises:
    performing semantic segmentation on the 2D image data to classify pixels within the 2D image data as belonging to classes of the ephemeral objects and the non-ephemeral objects detected in the area; and
    based on the classification of the pixels within the 2D image data, identifying the first set of pixels associated with the detected ephemeral objects and the second set of pixels associated with the detected non-ephemeral objects.

7. The computer-implemented method of claim 1, further comprising:
    before using the first set of pixels as a basis for identifying the ephemeral 3D data points, expanding the first set of pixels to include additional pixels that were not identified as being associated with the ephemeral objects detected in the area.

8. The computer-implemented method of claim 1, wherein the 2D image data and the 3D sensor data are captured by a vehicle that was operating in the area, and wherein the 2D image data has a temporal correlation with the 3D sensor data.

9. The computer-implemented method of claim 1, wherein the 3D sensor data comprises a point cloud of Light Detection and Ranging (LIDAR) data.

10. The computer-implemented method of claim 1, further comprising:
    using the 3D sensor data that has been filtered to provide a map of the area.

11. The computer-implemented method of claim 1, further comprising:

using the 3D sensor data that has been filtered to perform localization for a vehicle.

12. A non-transitory computer-readable medium comprising program instructions stored thereon that are executable by at least one processor such that a computing system is configured to:
    obtain two-dimensional (2D) image data and three-dimensional (3D) sensor data that is representative of an area;
    identify, within the 2D image data, a first set of pixels associated with ephemeral objects that are dynamic objects and a second set of pixels associated with non-ephemeral objects that are static objects;
    identify, within the 3D sensor data, 3D ephemeral data points associated with the ephemeral objects and non-ephemeral 3D data points associated with the non-ephemeral objects;
    map the ephemeral 3D data points and the non-ephemeral data points to a grid of voxels;
    responsive to determining that one or more voxels in the grid include a threshold extent of ephemeral 3D data points, filter the 3D sensor data to remove associated ones of the ephemeral 3D data points within the one or more voxels.

13. The computer-readable medium of claim 12, further comprising program instructions stored thereon that are executable by the at least one processor such that the computing system is configured to:
    determine whether the one or more voxels have a threshold extent of surrounding voxels that contain the threshold extent of ephemeral data points, and
    wherein the filtering is further based on the surrounding voxels.

14. The computer-readable medium of claim 13, further comprising program instructions stored thereon that are executable by the at least one processor such that the computing system is configured to:
    determination that determine whether the one or more voxels include a threshold number of total 3D data points, and
    wherein the filtering is further based on the total 3D data points.

15. The computer-readable medium of claim 14, wherein the threshold extent of the surrounding voxels also include the threshold number of total 3D data points.

16. The computer-readable medium of claim 12, wherein the program instructions that are executable by the at least one processor such that the computing system is configured to determine whether the one or more voxels include the threshold extent of ephemeral 3D data points comprise program instructions that are executable by the at least one processor such that the computing system is configured to:
    determine a ratio between ephemeral 3D data points and non-ephemeral 3D data points within an individual one of the one or more voxels; and
    determine whether the ratio between ephemeral 3D data points and non-ephemeral 3D data points within the individual one of the one or more voxels exceeds a threshold ratio.

17. The computer-readable medium of claim 12, wherein the program instructions that are executable by the at least one processor such that the computing system is configured to identify the first set of pixels associated with the ephemeral objects and the second set of pixels associated with the non-ephemeral objects comprise program instructions that are executable by the at least one processor such that the computing system is configured to:
    perform semantic segmentation on the 2D image data to classify pixels within the 2D image data as belonging to classes of the ephemeral objects and the non-ephemeral objects detected in the area; and
    based on the classification of the pixels within the 2D image data, identify the first set of pixels associated with the 3D ephemeral objects and the second set of pixels associated with the 3D non-ephemeral objects.

18. The computer-readable medium of claim 12, further comprising program instructions stored thereon that are executable by the at least one processor such that the computing system is configured to:
    before using the first set of pixels associated with the ephemeral objects as a basis for identifying the first set of 3D data points, expand the first set of pixels to include additional pixels that were not identified as being associated with 3D ephemeral objects detected in the area.

19. A computing system comprising:
    at least one processor;
    a non-transitory computer-readable medium; and
    program instructions stored on the non-transitory computer-readable medium that are executable by the at least one processor such that the computing system is configured to:
        obtain two-dimensional (2D) image data and three-dimensional (3D) sensor data that is representative of an area;
        identify, within the 2D image data, a first set of pixels associated with ephemeral objects that are dynamic objects and a second set of pixels associated with non-ephemeral objects that are static objects;
        identify, within the 3D sensor data, ephemeral 3D data points associated with the ephemeral objects and non-ephemeral 3D data points associated with the non-ephemeral objects;
        map the ephemeral 3D data points and the non-ephemeral data points to a grid of voxels;
        responsive to determining that one or more voxels in the grid include a threshold extent of ephemeral 3D data points, filter the 3D sensor data to remove associated ones of the ephemeral 3D data points within the one or more voxels.

20. The computing system of claim 19, wherein the program instructions that are executable by the at least one processor such that the computing system is configured to identify the first set of pixels associated with the ephemeral objects and the second set of pixels associated with the non-ephemeral objects comprise program instructions that are executable by the at least one processor such that the computing system is configured to:
    perform semantic segmentation on the 2D image data to classify pixels within the 2D image data as belonging to classes of the ephemeral objects and the non-ephemeral objects detected in the area; and
    based on the classification of the pixels within the 2D image data, identify the first set of pixels associated with the ephemeral objects and the second set of pixels associated with the non-ephemeral objects.

* * * * *